US012202521B2

(12) United States Patent
Raichelgauz et al.

(10) Patent No.: US 12,202,521 B2
(45) Date of Patent: *Jan. 21, 2025

(54) PREDICTION OF PEDESTRIAN ENTERING THE DRIVABLE SPACE

(71) Applicant: AUTOBRAINS TECHNOLOGIES LTD, Tel Aviv-Jaffa (IL)

(72) Inventors: Igal Raichelgauz, Tel Aviv (IL); Karina Odinaev, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,986

(22) Filed: Jun. 22, 2023

(65) Prior Publication Data
US 2024/0239376 A1 Jul. 18, 2024

Related U.S. Application Data

(60) Provisional application No. 63/366,839, filed on Jun. 22, 2022.

(51) Int. Cl.
*B60W 60/00* (2020.01)
(52) U.S. Cl.
CPC . *B60W 60/0015* (2020.02); *B60W 2554/4029* (2020.02)
(58) Field of Classification Search
None
See application file for complete search history.

(56) References Cited

U.S. PATENT DOCUMENTS

| | | | | |
|---|---|---|---|---|
| 10,625,748 | B1* | 4/2020 | Dong | B60W 30/0956 |
| 11,126,180 | B1* | 9/2021 | Kobilarov | B60W 30/18163 |
| 12,118,461 | B2* | 10/2024 | Rasouli | G06V 10/454 |
| 2018/0150750 | A1* | 5/2018 | Verdejo | G06N 5/02 |
| 2019/0108753 | A1* | 4/2019 | Kaiser | G08G 1/0141 |
| 2020/0307563 | A1* | 10/2020 | Ghafarianzadeh | G06V 40/25 |
| 2021/0241000 | A1* | 8/2021 | Pfeiffer | G06V 10/10 |
| 2022/0028253 | A1* | 1/2022 | Mell | G06V 20/41 |
| 2023/0144745 | A1* | 5/2023 | Ulutan | G06V 20/58 |
| | | | | 382/104 |

FOREIGN PATENT DOCUMENTS

JP 2009023560 A * 2/2009

* cited by examiner

*Primary Examiner* — David P. Merlino
(74) *Attorney, Agent, or Firm* — RECHES PATENTS

(57) ABSTRACT

A method for unregulated pedestrian step down (PSD) alert, the method may include (i) receiving, by a vehicle computerized system, a unregulated PSD indicators that are indicative of unregulated PSD situations; (ii) obtaining sensed information regarding an environment of the vehicle; (iii) processing the sensed information, wherein the processing comprises searching for at least one of the unregulated PSD indicators; and (iv) autonomously determining, when finding the at least one of the unregulated PSD identifiers, that the vehicle is approaching a situation in which a pedestrian is expected to step down into a drivable space within the environment of the vehicle. Wherein the autonomously determining triggering a response to the finding, the response is an immediate response and is executed by at least the vehicle computerized system.

16 Claims, 20 Drawing Sheets

Searching for overlaps between regions of interest (of the k'th iteration expansion operation results) and define regions of interest that are related to the overlaps 5031

Determine to drop one or more region of interest, and dropping according to the determination 5032

Searching for relationships between regions of interest (of the k'th iteration expansion operation results) and define regions of interest that are related to the relationship 5033

Searching for proximate regions of interest (of the k'th iteration expansion operation results) and define regions of interest that are related to the proximity 5034

Searching for relationships between regions of interest (of the k'th iteration expansion operation results) and define regions of interest that are related to the relationship 5035

Merging and/or dropping k'th iteration regions of interest based on shape information related to the k'th iteration regions of interest 5036

PREDICTION OF PEDESTRIAN ENTERING THE DRIVABLE SPACE

BACKGROUND

Pedestrians are extremely vulnerable road users, yet they are taking steps that are putting them in danger although it doesn't align with the traffic rules. One of such is stepping down on the road when the sidewalk is blocked by different causes e.g. parking vehicle, garbage can, street sweeper washing sidewalk, unloaded goods, etc. While driving the driver usually isn't aware that he is about to pass in adjacent to a blocked sidewalk, and can't anticipate or predict in advance that a pedestrian is going to leave the sidewalk, step down on the road and enter his drivable area.

SUMMARY

A method, system and non-transitory computer readable medium for predicting a unregulated pedestrian step down (PDD) event.

BRIEF DESCRIPTION OF THE DRAWINGS

The embodiments of the disclosure will be understood and appreciated more fully from the following detailed description, taken in conjunction with the drawings in which:

FIG. 1D illustrates an example of a merge operation;
FIG. 1O illustrates an example of a method.

DESCRIPTION OF EXAMPLE EMBODIMENTS

The specification and/or drawings may refer to an image. An image is an example of a media unit. Any reference to an image may be applied mutatis mutandis to a media unit. A media unit may be an example of sensed information. Any reference to a media unit may be applied mutatis mutandis to a natural signal such as but not limited to signal generated by nature, signal representing human behavior, signal representing operations related to the stock market, a medical signal, and the like. Any reference to a media unit may be applied mutatis mutandis to sensed information. The sensed information may be sensed by any type of sensors—such as a visual light camera, or a sensor that may sense infrared, radar imagery, ultrasound, electro-optics, radiography, LIDAR (light detection and ranging), etc.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be provide a system, a method, and a non-transitory computer readable medium for providing a method for unregulated pedestrian step down (PSD) alerting.

A regulated PSD event is an event in which the PSD is performed according to traffic rules and/or traffic laws and/or is identified by dedicated traffic signs and/or has a predefined (and defined by law) shape and/or size. An example of a regulated PSD event may include a pedestrian that cross the street using a pedestrian crossing (for example—a zebra crossing). The pedestrian crossing may be identified by explicit road signs and have shape and/or size that may follow laws or regulations.

An unregulated PSD event is an event in which the PSD is not performed according to traffic rules and/or traffic laws and/or is not identified by dedicated traffic signs and/or does not have a predefined (defined by law) shape and/or size. An example of an unregulated regulated PSD event may include a pedestrian that attempts to bypass one or more trash cans that are placed on the sidewalk and at least partially and temporarily block the sidewalk.

Figure 2:
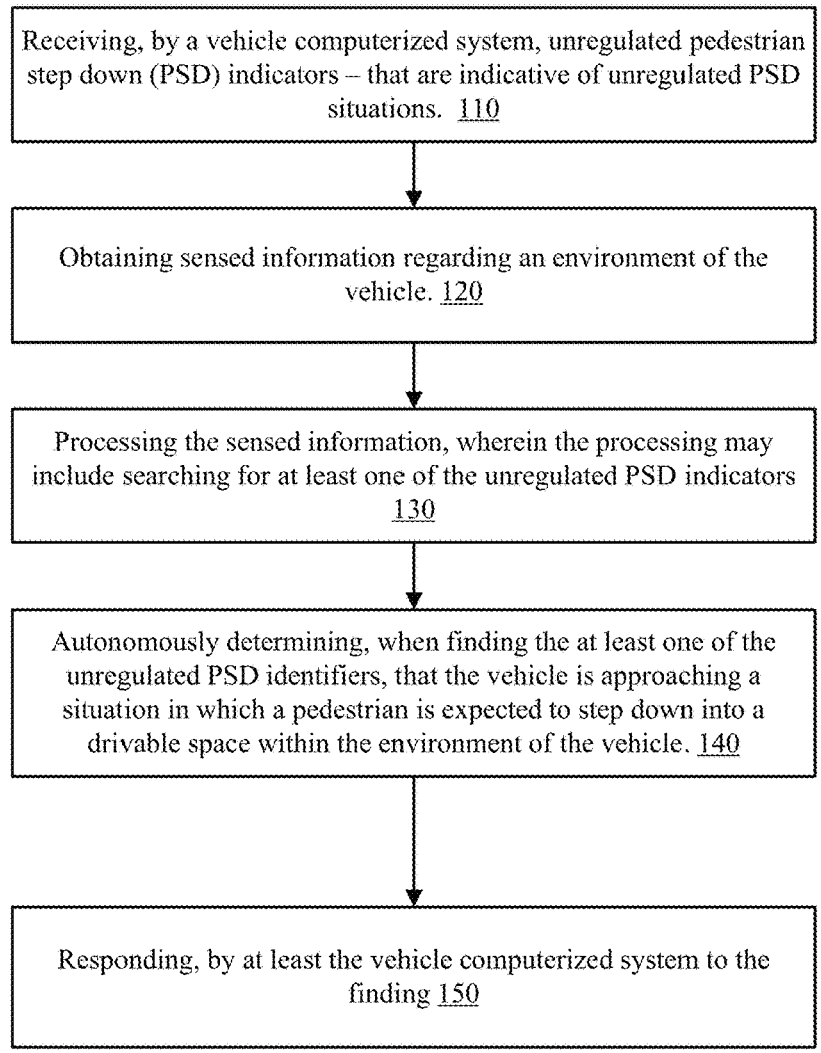
FIG. 2 illustrates an example of a method.

FIG. 2 is an example of a method 101. Method 101 may be executed by a computerized system of a vehicle, by a computerized systems of multiple vehicles (for example a by collaboration, by load balancing, by allocating different tasks between the different vehicles, and the like), by one or more computerized systems that does not belong to a vehicle, and the like.

Method 101 may start by step 110 of receiving, by a vehicle computerized system, unregulated pedestrian step down (PSD) indicators—that are indicative of unregulated PSD situations. Step 110 may be executed once, may be executed from time to time, and the like. Unregulated PSD indicators may be provided, updated, replaced, and the like.

An unregulated PSD indicator may be an unregulated PSD predictor—and in this case it may predict a near or probable unregulated PSD before the occurrence of the unregulated PSD. For example—detecting that one or more trash cans block the sidewalk and predict that an unregulated PSD is expected to occur near these trash cans.

Method 101 may also include step 120 of obtaining sensed information regarding an environment of the vehicle. The environment may include one or more sidewalks or any other paths that may not be a part of the road but are in proximity to the road. Step 120 may be continuously or non-continuously executed during a driving session.

Step 120 may be followed by step 130 of processing the sensed information, wherein the processing may include searching for at least one of the unregulated PSD indicators.

Step 130 may be followed by step 140 of autonomously determining, when finding the at least one of the unregulated PSD identifiers, that the vehicle is approaching a situation in which a pedestrian is expected to step down into a drivable space within the environment of the vehicle. If no unregulated PSD is found step 140 may be skipped.

The determining may also include determining a probability of occurrence of PSD event. The probability of occurrence may be determined based on statistics learnt during the generating of the PSD identifiers and/or based on additional information regarding the PSD events—for example timing statistics—such as timing of PSD events detected during the generation of the PSD identifier. For example—if pedestrians perform PSD at certain time windows (for example between 7-9 AM—but not during 5-6 AM)—then reaching a PSD identifier outside the time window will reduce the probability of the PSD event—and the responding may be impacted by the probability—for example ignore PSD indicators used as predictors if their probability of occurrence is below a threshold—for example outside the time window.

The autonomously determining may trigger a response to the finding, the response is an immediate response and is executed by at least the vehicle computerized system. Immediate may mean within less than a second, less than 1-3 seconds, and the like.

According to an embodiment, step 140 is followed by step 150 of responding, by at least the vehicle computerized system to the finding.

The responding may include at least one out of:
a) Changing a progress of the vehicle.
b) Transferring control from an autonomous system to driver assisted driving.
c) Transferring control from driver assisted driving to autonomous driving.
d) Generating an alert (that may or may not be human perceivable). Autonomously stopping the vehicle.
e) Driving away from an expected unregulated PSD event.
f) Accelerating.
g) Transmitting the alert to another vehicle.
h) Transmitting the alert to a pedestrian.
i) When the unregulated PSD indicator is a predictor—the vehicle may attempt to validate whether an unregulated PSD occurred (for example using a rear camera, receiving information from other vehicles that passed the potential PSD region on the road—after the vehicle, and the like).
j) Updating one or more potential PSD indicator based on the validation,
k) Updating probability of occurrence, and the like.
l) Warning the driver.
m) Activating specific driving mode, e.g., slower driving, ESA (emergency steering assist)—automatic maneuvering to a drivable area.
n) Activating active safety features (such as breaks).
o) Requesting and/or instructing from another unit of the vehicle to execute at least one of steps a)-n).
p) Triggering an execution, by another unit of the vehicle to execute at least one of steps a)-n).

At least some of the unregulated PSD indicators are cluster signatures and signature of the environment may be compared to the cluster signatured to detect a unregulated PSD event (or an expected and/or predicted unregulated PSD event).

Method 101 may include constantly matching the driving video to the step down indicators.

It should be noted that the unregulated PSD indicators may be location and/or time specific and that a data structure of locations and/or timing of events that result in unregulated PSD events may be provided—and may be accessed by a vehicle computer during driving—and when reaching a location (or a combination of a location and timing of arrival)—then a response (such as any response of step 140) may be triggered. For example—the events may be blocking sidewalks—for example—during a preliminary step that precedes emptying trach cans). The data structure can be used in addition to or instead of step 130.

It should also be noted that method 100 may be applied for detecting regulated PSD events (for example when reaching pedestrian crossings)—in addition to a detection of the unregulated PSD events.

It should also be noted that PSD events may occur randomly—or without any visible reason. In many cases these random PSD can not be predicted. In other cases—if these PSD events occur enough times—they may be detected.

Figure 3:
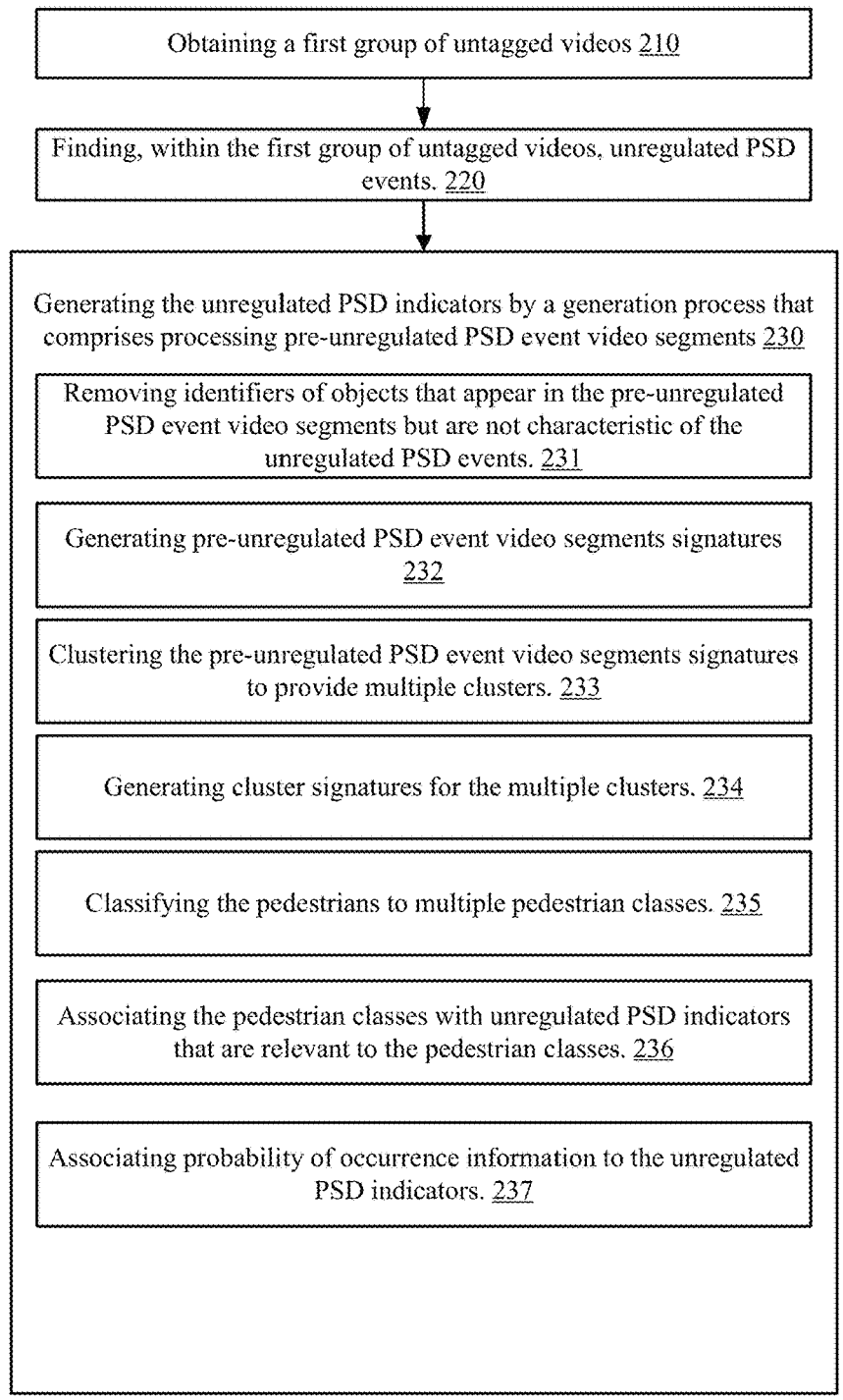
FIG. 3 illustrates an example of a method.

FIG. 3 is an example of method 201 for generating unregulated PSD indicators.

Method 201 may start by step 210 of obtaining a first group of untagged videos.

Step 210 may be followed by step 220 of finding, within the first group of untagged videos, unregulated PSD events.

Step 220 may be followed by step 230 of generating the unregulated PSD indicators by a generation process that comprises processing pre-unregulated PSD event video segments, wherein each pre-unregulated PSD event video segments starts at a predefined time period (for example 2-20 seconds) before a corresponding unregulated PSD event of the unregulated PSD events. The processing includes finding indicators that may distinguish the pre-unregulated PSD event video segments from video segments that are note related to the PSD events—for example video segments taken at a substantial timing difference from any PSD event.

Step 230 may include at least some of the following steps:
Step 231 of removing identifiers of objects that appear in the pre-unregulated PSD event video segments but are not characteristic of the unregulated PSD events. The removing may include searching for objects that appear, above a predefined probability, in video segments that differ from the pre-unregulated PSD event video segments.
Step 232 of generating pre-unregulated PSD event video segments signatures.
Step 233 of clustering the pre-unregulated PSD event video segments signatures to provide multiple clusters.
Step 234 of generating cluster signatures for the multiple clusters.
Step 235 of classifying the pedestrians to multiple pedestrian classes. The classes may not be known in advance and may be found based on statistics of the found PSD events.
Step 236 of associating the pedestrian classes with unregulated PSD indicators that are relevant to the pedestrian classes. Different classes of pedestrians may be associated with different clusters. Step 230 may find the mapping between classes of pedestrians and PDS events.
Step 237 of associating probability of occurrence information to the unregulated PSD indicators. The number of occurrences of PSD events identified by the unregulated PSD indicators may be mapped (using any probability function) to the probability of occurrence—for example a ratio between an occurrences of a specific PSD event and an overall number of detected PSD events.

The generating of the unregulated PSD indicator may include, for example, at least some of the following steps:

Collecting untagged video streams—for example from a dash camera or from other vehicle camera—or from any other source.

Applying any techniques of drivable space detection.

Applying any technique of pedestrian detection.

Identifying, in any of the untagged video streams, PSD events during which a pedestrian gets into the drivable space.

Whenever a PSD event is captures by any of the untagged video—extracting, a video segment that starts a predefined period (for example 1-10 seconds, 5-20 seconds, 2-30 seconds, up to a minute, more than a minute) before the PSD event—and may end at the PSD event or after the PSD event.

Performing clustering in an unsupervised way of the video segments to identify different PSD events, as well as all types of objects and scenes that can cause stepping down event (e.g., parking vehicle on sidewalk, x cm available in sidewalk+pedestrian with baby carriage, washing machine/garbage bin on the sidewalk). Examples of objects that could be clustered: specific elements that block the pedestrian sidewalk path (e.g., parking vehicle, road maintenance/construction, garbage truck, garbage bins, vehicle unloading equipment) or scenarios that force certain pedestrian to step down (e.g., limited space in the sidewalk and pedestrian with baby carriage/wheelchair/shopping cart), in different environments (rural/urban, weather/lighting conditions).

Obtaining random videos and remove clustered objects that appear with high probability in random videos (e.g. traffic lights, pavement tiles).

Save as concepts/models objects that successfully clustered but weren't removed by the random set. It is possible that certain combinations of clustered concepts will appear (e.g. stroller+garbage bin, meaning that a person without a stroller will be able to pass and not get to the road, while the stroller can't)

Figure 4:
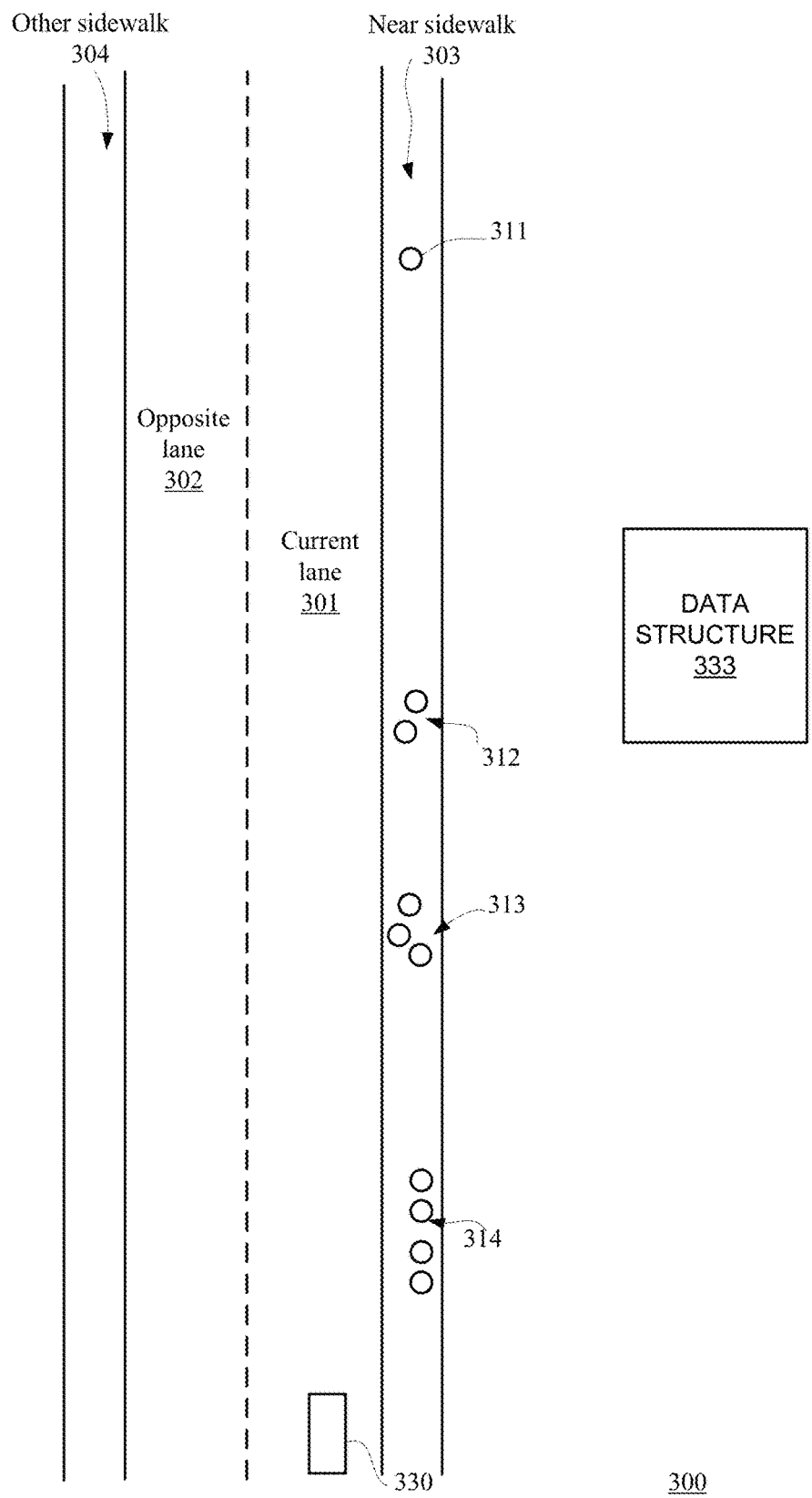
FIG. 4 illustrates an example of an execution of a method

FIG. 4 illustrates an example of an execution of method 101.

A vehicle 330 is driving within environment 300. The environment includes a road that include a current lane 301 (vehicle 303 drives in the current lane 301) and an opposite lane 302. There are also a near sidewalk 303 and an other sidewalk 304. The vehicle camera captures four groups of trach cans located on the near sidewalk 303. A first group 311 of trash cans includes a column of four trach cans that are parallel to the edge of the near sidewalk. A second group 312 of trash cans includes a three trash cans that form an triangle. A third group 313 of trash cans includes a pair of trash cans. A forth group 314 of trash cans is a single trash can. The unregulated PSD indicators indicate which group (if any) are related to PSD events. When one of the groups is associated with an unregulated PSD indicator then step 140 may be executed by the vehicle 330. FIG. 4 also illustrated an example of data structure 333 of data structure of unregulated PSD events.

It should be noted that a data structure of unregulated PSD events may be formed—for example a map that include location and/or timing information relating to the occurrence (known and/or expected future occurrence) and/or any other metadata (for example type of PSD event) of unregulated PSD events.

Future drivers/self-driving cars can be alerted before arriving at the locations of the unregulated PSD events according to their location. This data structure may be updated in any update frequency (for example—high frequency—for example each few minutes, each hour, and the like) since its content may be dynamic. Moreover, a data structure analysis can be done, and certain rules can be derived—e.g., a certain location is usually blocked at certain hours/days, etc.

Low Power Generation of Signatures

The analysis of content of a media unit may be executed by generating a signature of the media unit and by comparing the signature to reference signatures. The reference signatures may be arranged in one or more concept structures or may be arranged in any other manner. The signatures may be used for object detection or for any other use.

The signature may be generated by creating a multidimensional representation of the media unit. The multidimensional representation of the media unit may have a very large number of dimensions. The high number of dimensions may guarantee that the multidimensional representation of different media units that include different objects is sparse—and that object identifiers of different objects are distant from each other—thus improving the robustness of the signatures.

The generation of the signature is executed in an iterative manner that includes multiple iterations, each iteration may include an expansion operations that is followed by a merge operation. The expansion operation of an iteration is performed by spanning elements of that iteration. By determining, per iteration, which spanning elements (of that iteration) are relevant—and reducing the power consumption of irrelevant spanning elements—a significant amount of power may be saved.

In many cases, most of the spanning elements of an iteration are irrelevant—thus after determining (by the spanning elements) their relevancy—the spanning elements that are deemed to be irrelevant may be shut down a/or enter an idle mode.

Figure 1A:
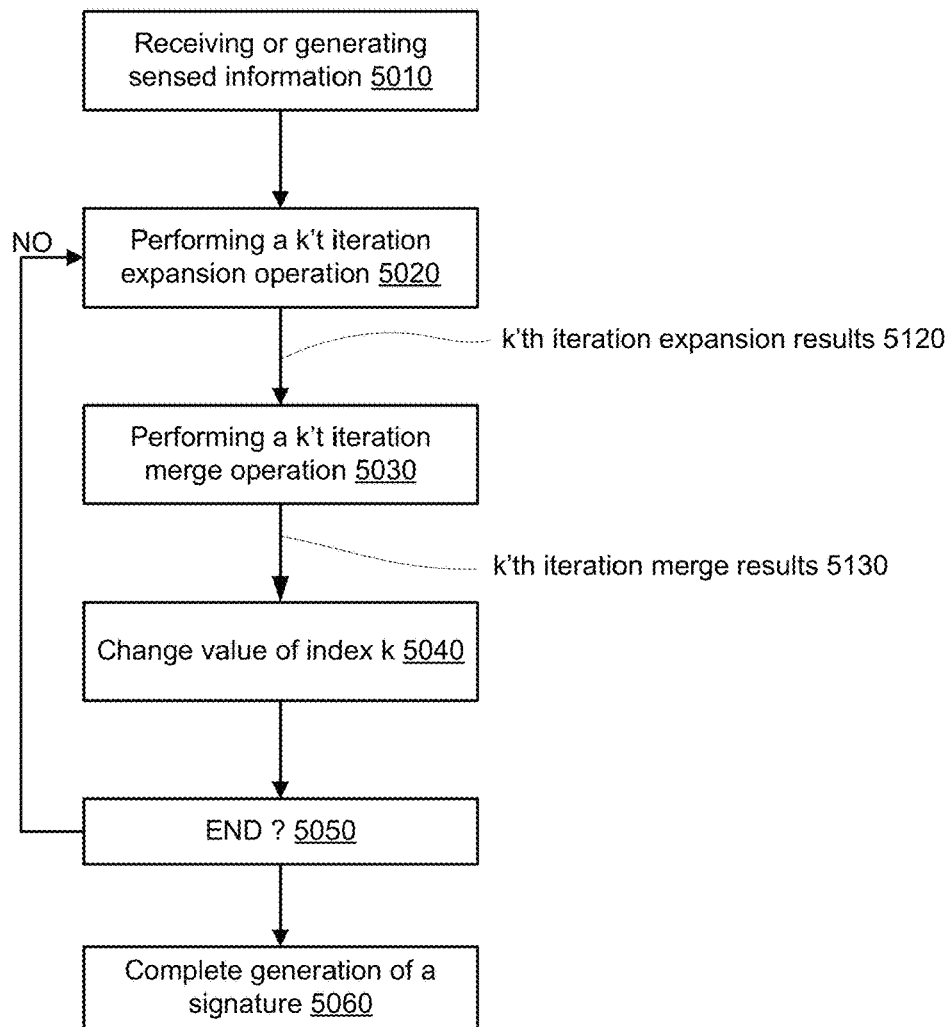
FIG. 1A illustrates an example of a method.

FIG. 1A illustrates a method 5000 for generating a signature of a media unit.

Method 5000 may start by step 5010 of receiving or generating sensed information.

The sensed information may be a media unit of multiple objects.

Step 5010 may be followed by processing the media unit by performing multiple iterations, wherein at least some of the multiple iterations comprises applying, by spanning elements of the iteration, dimension expansion process that are followed by a merge operation.

The processing may include:

Step 5020 of performing a k'th iteration expansion process (k may be a variable that is used to track the number of iterations).

Step 5030 of performing a k'th iteration merge process.

Step 5040 of changing the value of k.

Step 5050 of checking if all required iterations were done—if so proceeding to step 5060 of completing the generation of the signature. Else—jumping to step 5020.

The output of step 5020 is a k'th iteration expansion results 5120.

The output of step 5030 is a k'th iteration merge results 5130.

For each iteration (except the first iteration)—the merge result of the previous iteration is an input to the current iteration expansion process.

At least some of the K iterations involve selectively reducing the power consumption of some spanning elements (during step 5020) that are deemed to be irrelevant.

Figure 1B:
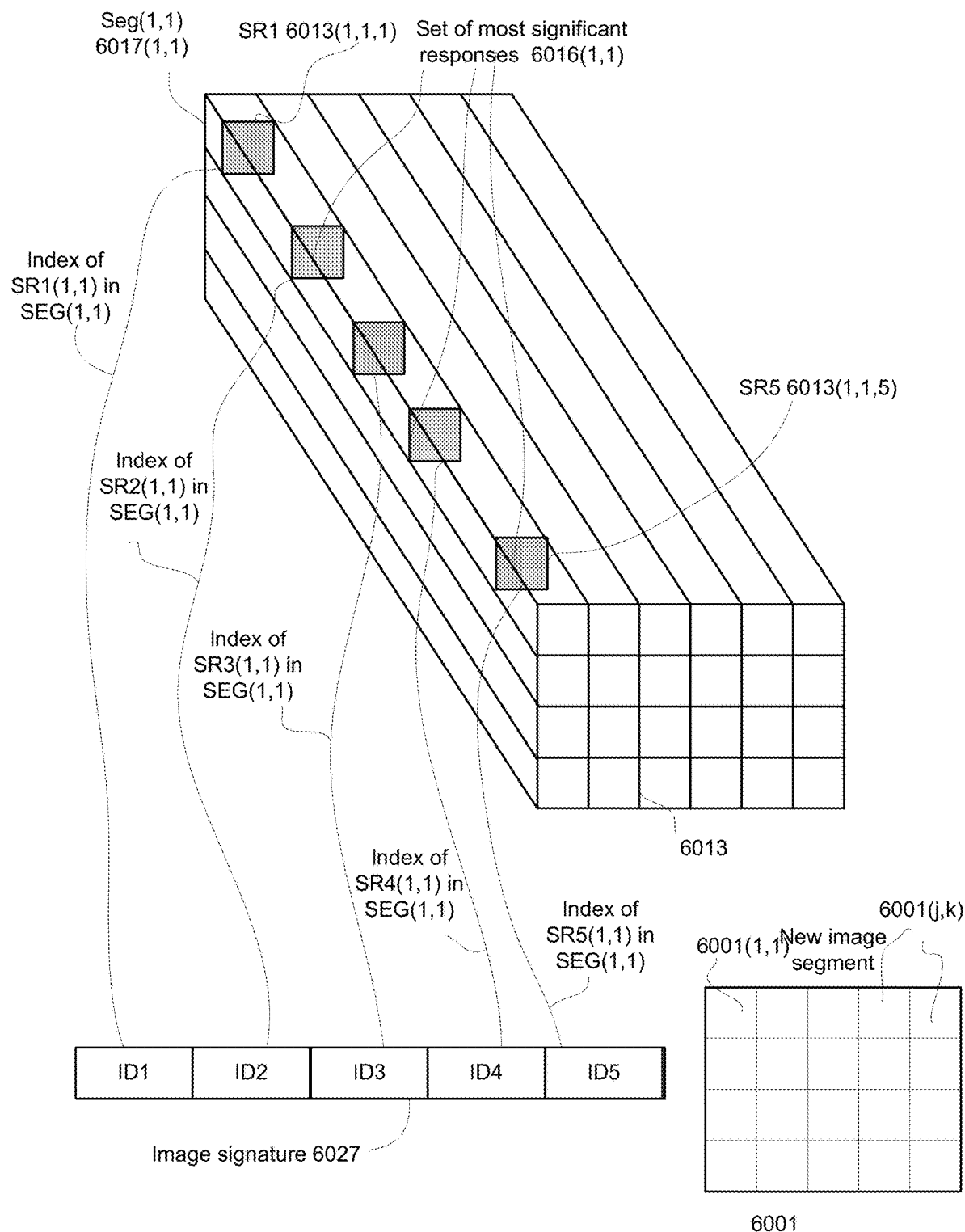
FIG. 1B illustrates an example of a signature.

FIG. 1B is an example of an image signature 6027 of a media unit that is an image 6000 and of an outcome 6013 of the last (K'th) iteration.

The image 6001 is virtually segments to segments 6000 (i,k). The segments may be of the same shape and size but this is not necessarily so.

Outcome 6013 may be a tensor that includes a vector of values per each segment of the media unit. One or more objects may appear in a certain segment. For each object—an object identifier (of the signature) points to locations of significant values, within a certain vector associated with the certain segment.

For example—a top left segment (6001(1,1)) of the image may be represented in the outcome 6013 by a vector V(1,1) 6017(1,1) that has multiple values. The number of values per vector may exceed 100, 200, 500, 1000, and the like.

The significant values (for example—more than 10, 20, 30, 40 values, and/or more than 0.1%, 0.2%. 0.5%, 1%, 5% of all values of the vector and the like) may be selected. The significant values may have the values—but may be selected in any other manner.

FIG. 1B illustrates a set of significant responses 6015(1,1) of vector V(1,1) 6017(1,1). The set includes five significant values (such as first significant value SV1(1,1) 6013(1,1,1), second significant value SV2(1,1), third significant value SV3(1,1), fourth significant value SV4(1,1), and fifth significant value SV5(1,1) 6013(1,1,5).

The image signature 6027 includes five indexes for the retrieval of the five significant values—first till fifth identifiers ID1-ID5 are indexes for retrieving the first till fifth significant values.

Figure 1C:
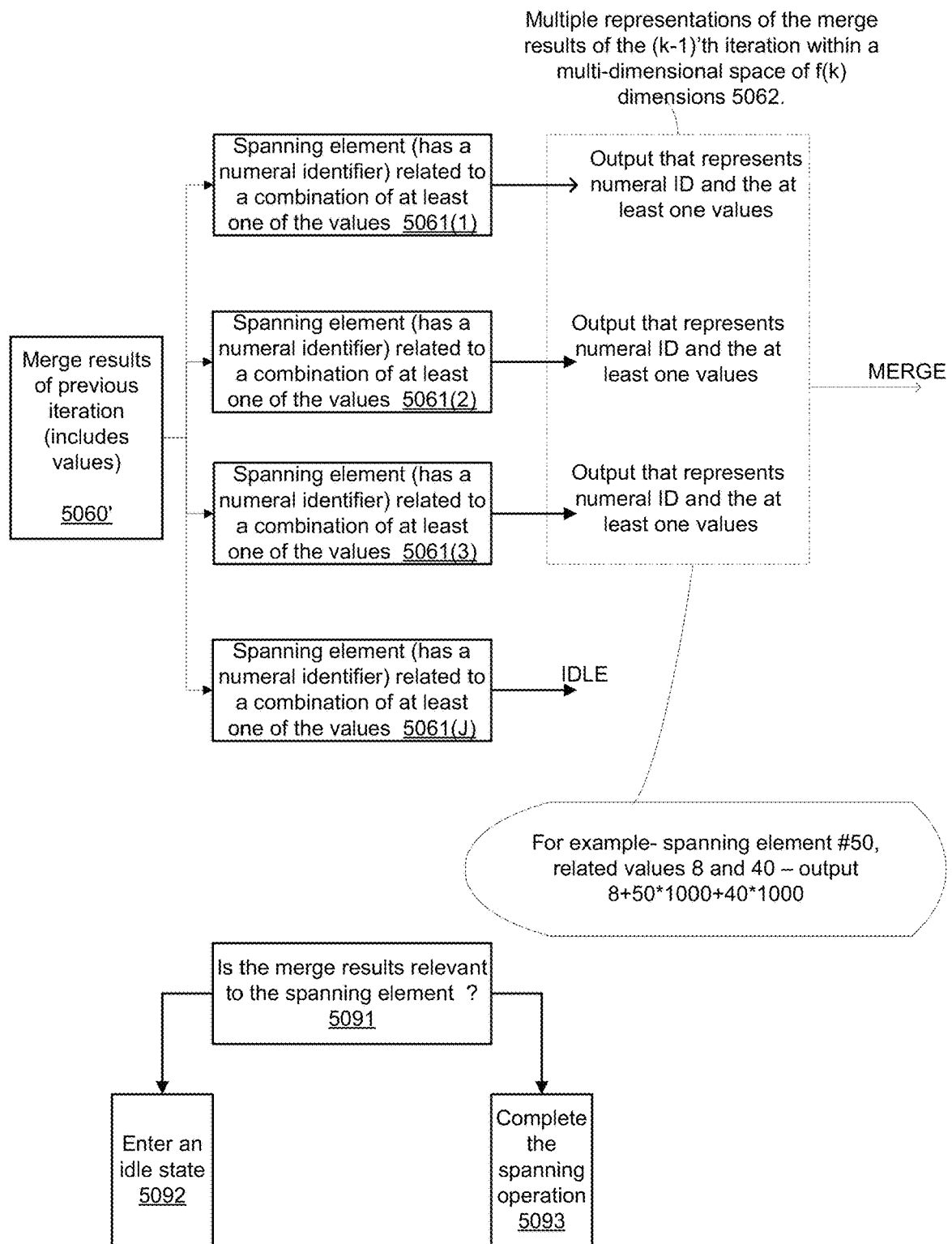
FIG. 1C illustrates an example of a dimension expansion process.

FIG. 1C illustrates a k'th iteration expansion process.

The k'th iteration expansion process start by receiving the merge results 5060' of a previous iteration.

The merge results of a previous iteration may include values are indicative of previous expansion processes—for example—may include values that are indicative of relevant spanning elements from a previous expansion operation, values indicative of relevant regions of interest in a multi-dimensional representation of the merge results of a previous iteration.

The merge results (of the previous iteration) are fed to spanning elements such as spanning elements 5061(1)-5061(J).

Each spanning element is associated with a unique set of values. The set may include one or more values. The spanning elements apply different functions that may be orthogonal to each other. Using non-orthogonal functions may increase the number of spanning elements—but this increment may be tolerable.

The spanning elements may apply functions that are decorrelated to each other—even if not orthogonal to each other.

The spanning elements may be associated with different combinations of object identifiers that may "cover" multiple possible media units. Candidates for combinations of object identifiers may be selected in various manners—for example based on their occurrence in various images (such as test images) randomly, pseudo randomly, according to some rules and the like. Out of these candidates the combinations may be selected to be decorrelated, to cover said multiple possible media units and/or in a manner that certain objects are mapped to the same spanning elements.

Each spanning element compares the values of the merge results to the unique set (associated with the spanning element) and if there is a match—then the spanning element is deemed to be relevant. If so—the spanning element completes the expansion operation.

If there is no match—the spanning element is deemed to be irrelevant and enters a low power mode. The low power mode may also be referred to as an idle mode, a standby mode, and the like. The low power mode is termed low power because the power consumption of an irrelevant spanning element is lower than the power consumption of a relevant spanning element.

In FIG. 1C various spanning elements are relevant (5061(1)-5061(3)) and one spanning element is irrelevant (5061(J)).

Each relevant spanning element may perform a spanning operation that includes assigning an output value that is indicative of an identity of the relevant spanning elements of the iteration. The output value may also be indicative of identities of previous relevant spanning elements (from previous iterations).

For example—assuming that spanning element number fifty is relevant and is associated with a unique set of values of eight and four—then the output value may reflect the numbers fifty, four and eight—for example one thousand multiplied by (fifty+forty) plus forty. Any other mapping function may be applied.

FIG. 1C also illustrates the steps executed by each spanning element:

Checking if the merge results are relevant to the spanning element (step 5091).

If—so—completing the spanning operation (step 5093).

If not—entering an idle state (step 5092).

FIG. 1D is an example of various merge operations.

A merge operation may include finding regions of interest. The regions of interest are regions within a multidimensional representation of the sensed information. A region of interest may exhibit a more significant response (for example a stronger, higher intensity response).

The merge operation (executed during a k'th iteration merge operation) may include at least one of the following:

Step 5031 of searching for overlaps between regions of interest (of the k'th iteration expansion operation results) and define regions of interest that are related to the overlaps.

Step 5032 of determining to drop one or more region of interest, and dropping according to the determination.

Step 5033 of searching for relationships between regions of interest (of the k'th iteration expansion operation results) and define regions of interest that are related to the relationship.

Step 5034 of searching for proximate regions of interest (of the k'th iteration expansion operation results) and define regions of interest that are related to the proximity. Proximate may be a distance that is a certain fraction (for example less than 1%) of the multi-dimensional space, may be a certain fraction of at least one of the regions of interest that are tested for proximity.

Step 5035 of searching for relationships between regions of interest (of the k'th iteration expansion operation results) and define regions of interest that are related to the relationship.

Step 5036 of merging and/or dropping k'th iteration regions of interest based on shape information related to shape of the k'th iteration regions of interest.

The same merge operations may applied in different iterations.

Alternatively, different merge operations may be executed during different iterations.

Figure 1E:
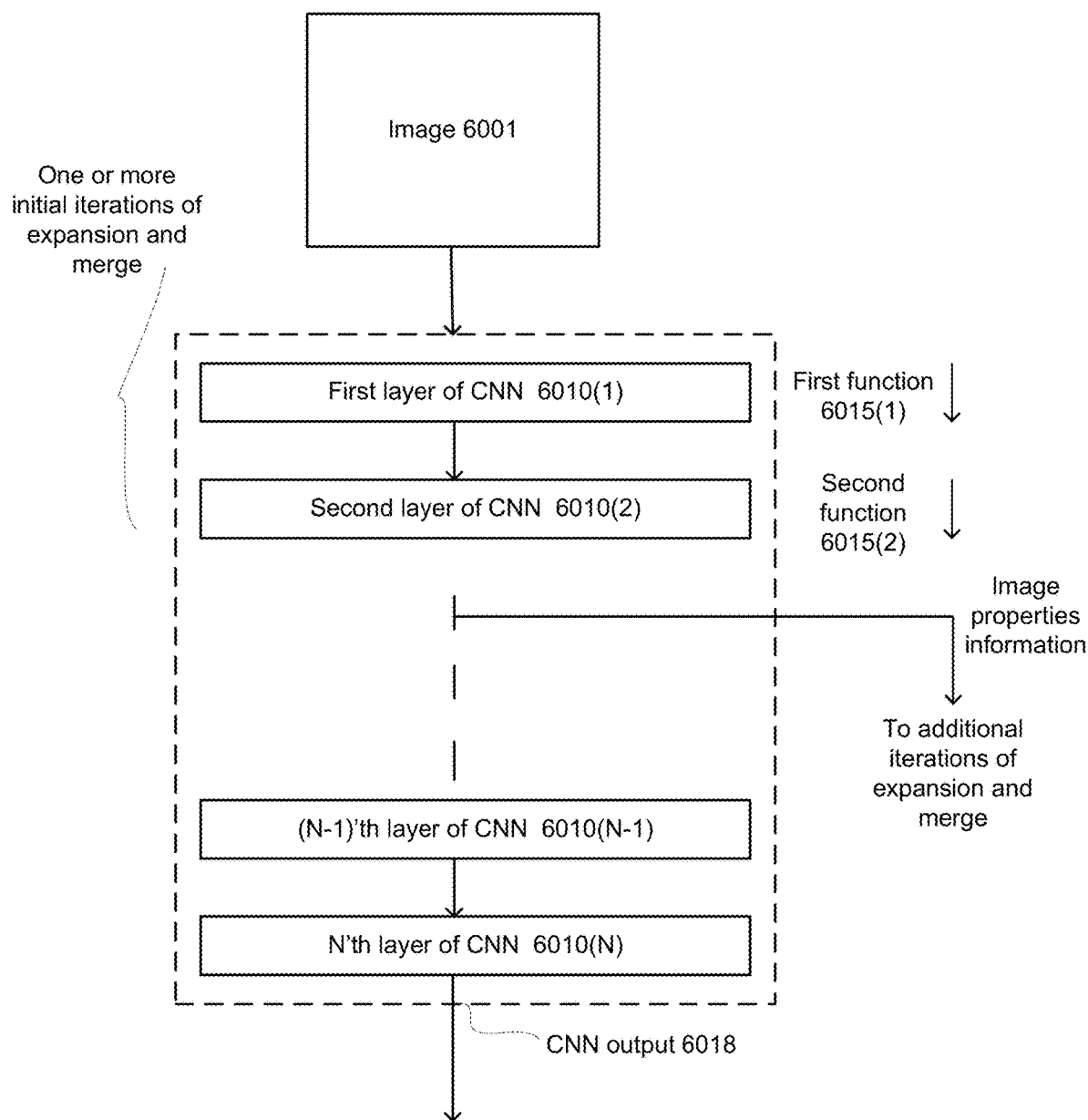
FIG. 1E illustrates an example of hybrid process.

FIG. 1E illustrates an example of a hybrid process and an input image 6001.

The hybrid process is hybrid in the sense that some expansion and merge operations are executed by a convolutional neural network (CNN) and some expansion and merge operations (denoted additional iterations of expansion and merge) are not executed by the CNN—but rather by a process that may include determining a relevancy of spanning elements and entering irrelevant spanning elements to a low power mode.

In FIG. 1E one or more initial iterations are executed by first and second CNN layers 6010(1) and 6010(2) that apply first and second functions 6015(1) and 6015(2).

The output of these layers provided information about image properties. The image properties may not amount to object detection. Image properties may include location of edges, properties of curves, and the like.

The CNN may include additional layers (for example third till N'th layer 6010(N)) that may provide a CNN output 6018 that may include object detection information. It should be noted that the additional layers may not be included.

It should be noted that executing the entire signature generation process by a hardware CNN of fixed connectivity may have a higher power consumption—as the CNN will not be able to reduce the power consumption of irrelevant nodes.

Figure 1F:
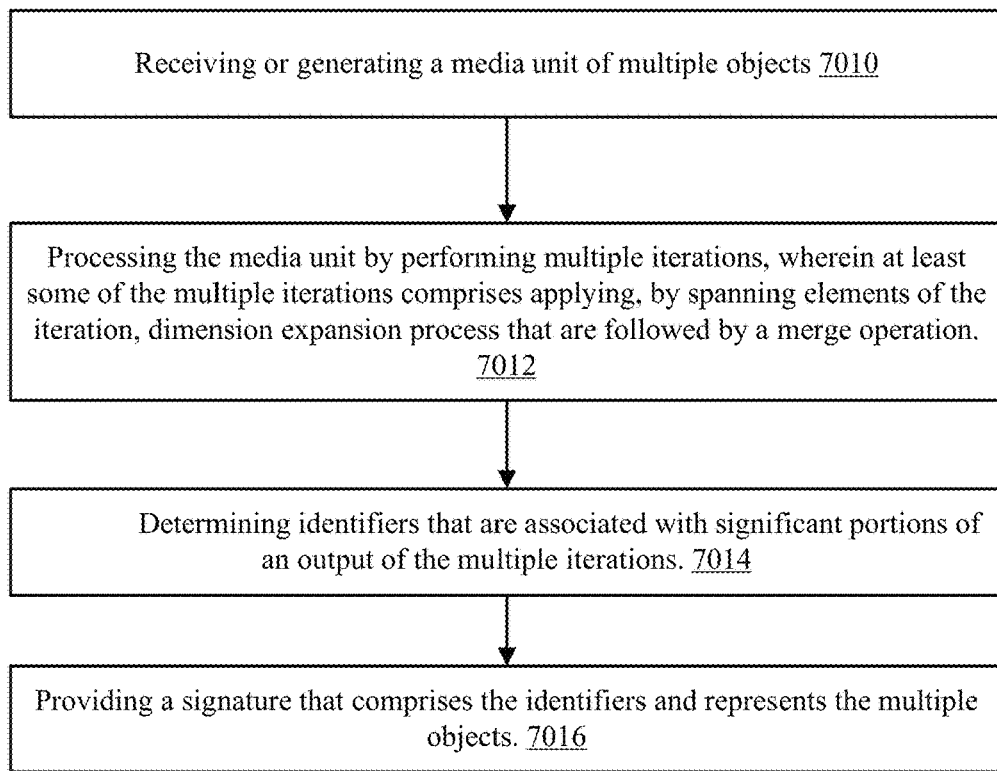
FIG. 1F illustrates an example of a method.

FIG. 1F illustrates a method 7000 for low-power calculation of a signature.

Method 7000 starts by step 7010 of receiving or generating a media unit of multiple objects.

Step 7010 may be followed by step 7012 of processing the media unit by performing multiple iterations, wherein at least some of the multiple iterations comprises applying, by spanning elements of the iteration, dimension expansion process that are followed by a merge operation.

The applying of the dimension expansion process of an iteration may include (a) determining a relevancy of the spanning elements of the iteration; and (b) completing the dimension expansion process by relevant spanning elements of the iteration and reducing a power consumption of irrelevant spanning elements until, at least, a completion of the applying of the dimension expansion process.

The identifiers may be retrieval information for retrieving the significant portions.

The at least some of the multiple iterations may be a majority of the multiple iterations.

The output of the multiple iteration may include multiple property attributes for each segment out of multiple segments of the media unit; and wherein the significant portions of an output of the multiple iterations may include more impactful property attributes.

The first iteration of the multiple iteration may include applying the dimension expansion process by applying different filters on the media unit.

The at least some of the multiple iteration exclude at least a first iteration of the multiple iterations. See, for example, FIG. 1E.

The determining the relevancy of the spanning elements of the iteration may be based on at least some identities of relevant spanning elements of at least one previous iteration.

The determining the relevancy of the spanning elements of the iteration may be based on at least some identities of relevant spanning elements of at least one previous iteration that preceded the iteration.

The determining the relevancy of the spanning elements of the iteration may be based on properties of the media unit.

The determining the relevancy of the spanning elements of the iteration may be performed by the spanning elements of the iteration.

Method 7000 may include a neural network processing operation that may be executed by one or more layers of a neural network and does not belong to the at least some of the multiple iterations. See, for example, FIG. 1E.

The at least one iteration may be executed without reducing power consumption of irrelevant neurons of the one or more layers.

The one or more layers may output information about properties of the media unit, wherein the information differs from a recognition of the multiple objects.

The applying, by spanning elements of an iteration that differs from the first iteration, the dimension expansion process may include assigning output values that may be indicative of an identity of the relevant spanning elements of the iteration. See, for example, FIG. 1C.

The applying, by spanning elements of an iteration that differs from the first iteration, the dimension expansion process may include assigning output values that may be indicative a history of dimension expansion processes until the iteration that differs from the first iteration.

The each spanning element may be associated with a subset of reference identifiers. The determining of the relevancy of each spanning elements of the iteration may be based a relationship between the subset of the reference identifiers of the spanning element and an output of a last merge operation before the iteration.

The output of a dimension expansion process of an iteration may be a multidimensional representation of the media unit that may include media unit regions of interest that may be associated with one or more expansion processes that generated the regions of interest.

The merge operation of the iteration may include selecting a subgroup of media unit regions of interest based on a spatial relationship between the subgroup of multidimensional regions of interest.

Method 7000 may include applying a merge function on the subgroup of multidimensional regions of interest. See, for example, FIG. 1C.

Method 7000 may include applying an intersection function on the subgroup of multidimensional regions of interest. See, for example, FIG. 1C.

The merge operation of the iteration may be based on an actual size of one or more multidimensional regions of interest.

The merge operation of the iteration may be based on relationship between sizes of the multidimensional regions of interest. For example—larger multidimensional regions of interest may be maintained while smaller multidimensional regions of interest may be ignored of.

The merge operation of the iteration may be based on changes of the media unit regions of interest during at least the iteration and one or more previous iteration.

Step 7012 may be followed by step 7014 of determining identifiers that are associated with significant portions of an output of the multiple iterations.

Step 7014 may be followed by step 7016 of providing a signature that comprises the identifiers and represents the multiple objects.

Localization and Segmentation

Any of the mentioned above signature generation method provides a signature that does not explicitly includes accurate shape information. This adds to the robustness of the signature to shape related inaccuracies or to other shape related parameters.

The signature includes identifiers for identifying media regions of interest.

Each media region of interest may represent an object (for example a vehicle, a pedestrian, a road element, a human made structure, wearables, shoes, a natural element such as a tree, the sky, the sun, and the like) or a part of an object (for example—in the case of the pedestrian—a neck, a head, an arm, a leg, a thigh, a hip, a foot, an upper arm, a forearm, a wrist, and a hand). It should be noted that for object detection purposes a part of an object may be regarded as an object.

The exact shape of the object may be of interest.

Figure 1G:
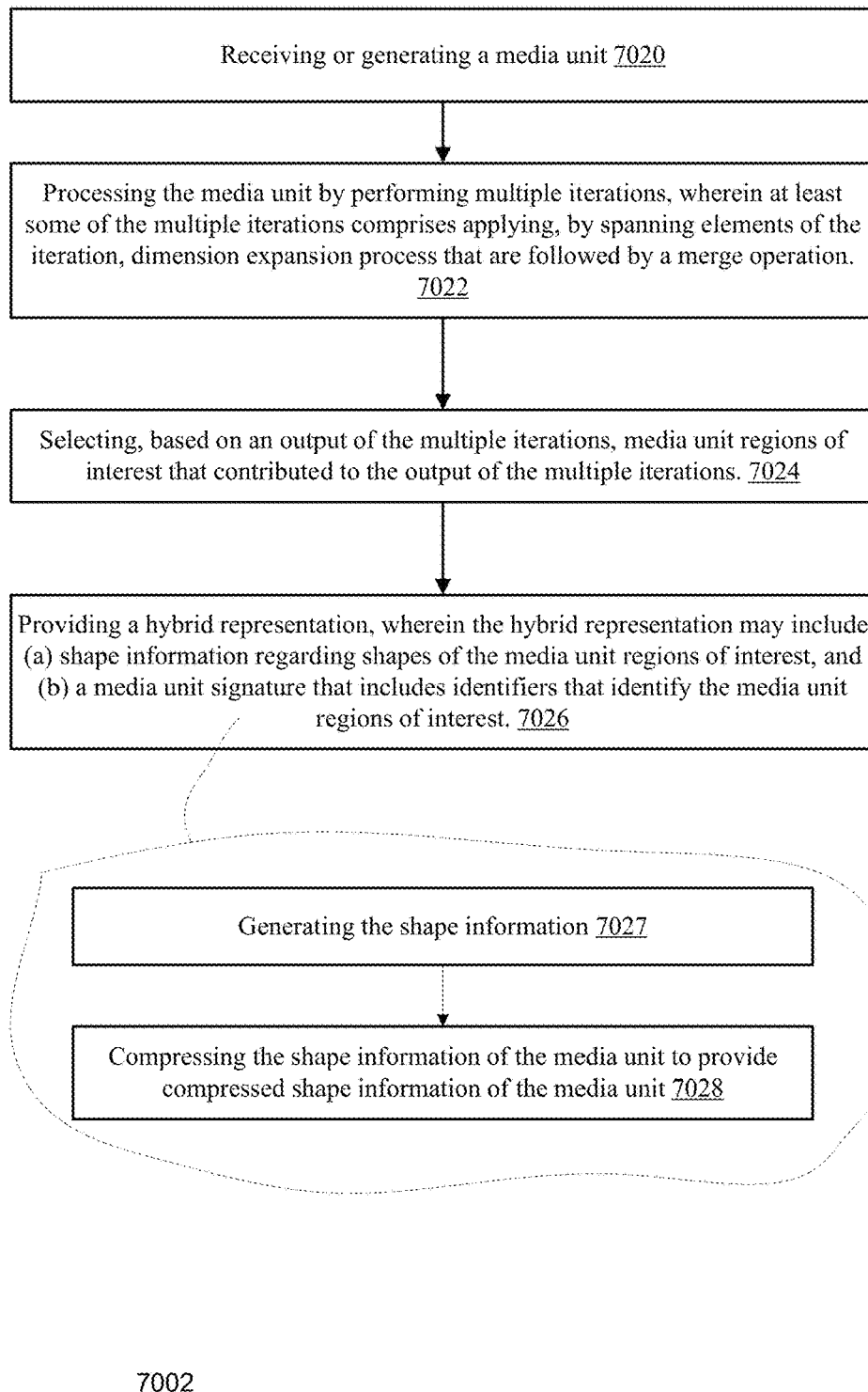
FIG. 1G illustrates an example of a method.

FIG. 1G illustrates method 7002 of generating a hybrid representation of a media unit.

Method 7002 may include a sequence of steps 7020, 7022, 7024 and 7026.

Step 7020 may include receiving or generating the media unit.

Step 7022 may include processing the media unit by performing multiple iterations, wherein at least some of the multiple iterations comprises applying, by spanning elements of the iteration, dimension expansion process that are followed by a merge operation.

Step 7024 may include selecting, based on an output of the multiple iterations, media unit regions of interest that contributed to the output of the multiple iterations.

Step 7026 may include providing a hybrid representation, wherein the hybrid representation may include (a) shape information regarding shapes of the media unit regions of interest, and (b) a media unit signature that includes identifiers that identify the media unit regions of interest.

Step 7024 may include selecting the media regions of interest per segment out of multiple segments of the media unit. See, for example, FIG. 2.

Step 7026 may include step 7027 of generating the shape information.

The shape information may include polygons that represent shapes that substantially bound the media unit regions of interest. These polygons may be of a high degree.

In order to save storage space, the method may include step 7028 of compressing the shape information of the media unit to provide compressed shape information of the media unit.

Figure 1H:
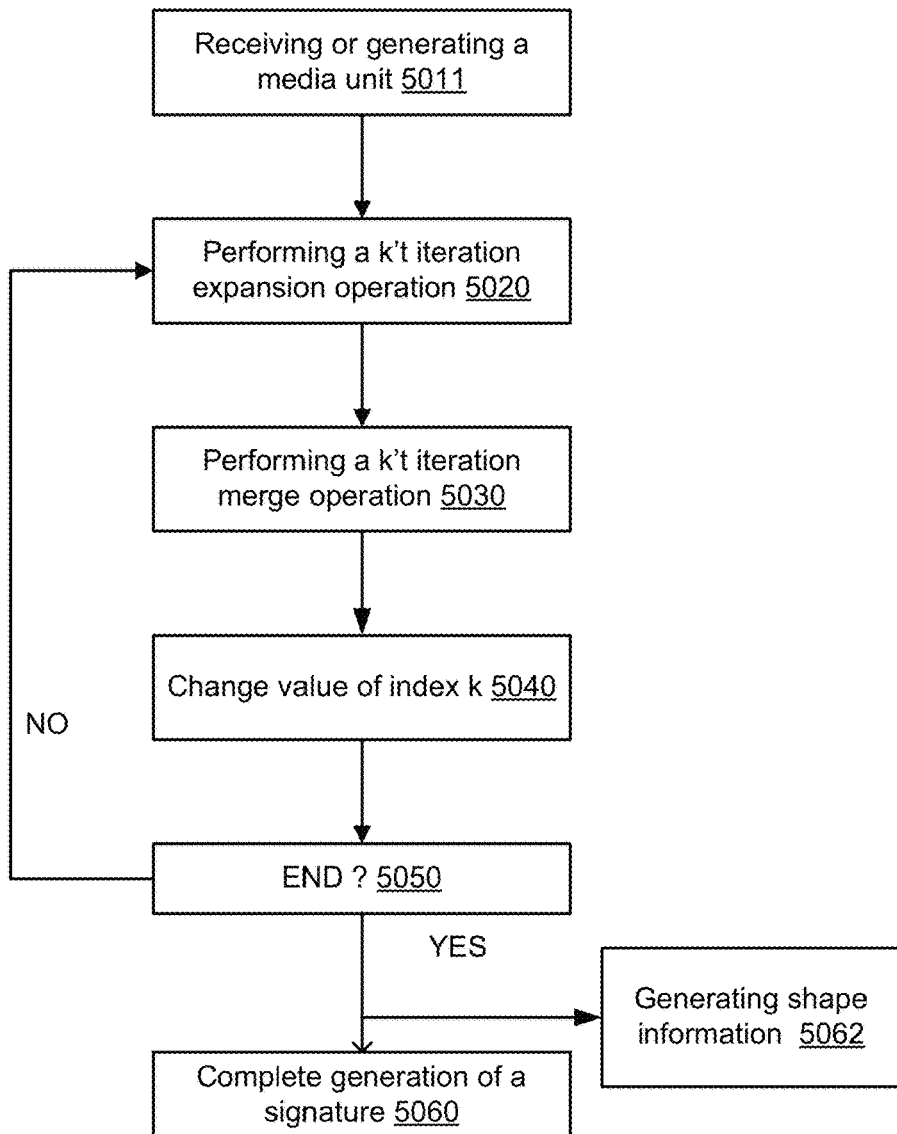
FIG. 1H illustrates an example of a method.

FIG. 1H illustrates method 5002 for generating a hybrid representation of a media unit.

Method 5002 may start by step 5011 of receiving or generating a media unit.

Step 5011 may be followed by processing the media unit by performing multiple iterations, wherein at least some of the multiple iterations comprises applying, by spanning elements of the iteration, dimension expansion process that are followed by a merge operation.

The processing may be followed by steps 5060 and 5062.

The processing may include steps 5020, 5030, 5040 and 5050.

Step 5020 may include performing a k'th iteration expansion process (k may be a variable that is used to track the number of iterations).

Step 5030 may include performing a k'th iteration merge process.

Step 5040 may include changing the value of k.

Step 5050 may include checking if all required iterations were done—if so proceeding to steps 5060 and 5062. Else—jumping to step 5020.

The output of step 5020 is a k'th iteration expansion result.

The output of step 5030 is a k'th iteration merge result.

For each iteration (except the first iteration)—the merge result of the previous iteration is an input to the current iteration expansion process.

Step 5060 may include completing the generation of the signature.

Step 5062 may include generating shape information regarding shapes of media unit regions of interest. The signature and the shape information provide a hybrid representation of the media unit.

The combination of steps 5060 and 5062 amounts to a providing a hybrid representation, wherein the hybrid representation may include (a) shape information regarding shapes of the media unit regions of interest, and (b) a media unit signature that includes identifiers that identify the media unit regions of interest.

Object Detection Using Compressed Shape Information.

Object detection may include comparing a signature of an input image to signatures of one or more cluster structures in order to find one or more cluster structures that include one or more matching signatures that match the signature of the input image.

The number of input images that are compared to the cluster structures may well exceed the number of signatures of the cluster structures. For example—thousands, tens of thousands, hundreds of thousands (and even more) of input signature may be compared to much less cluster structure signatures. The ratio between the number of input images to the aggregate number of signatures of all the cluster structures may exceed ten, one hundred, one thousand, and the like.

In order to save computational resources, the shape information of the input images may be compressed.

On the other hand—the shape information of signatures that belong to the cluster structures may be uncompressed—and of higher accuracy than those of the compressed shape information.

When the higher quality is not required—the shape information of the cluster signature may also be compressed.

Compression of the shape information of cluster signatures may be based on a priority of the cluster signature, a popularity of matches to the cluster signatures, and the like.

The shape information related to an input image that matches one or more of the cluster structures may be calculated based on shape information related to matching signatures.

For example—a shape information regarding a certain identifier within the signature of the input image may be determined based on shape information related to the certain identifiers within the matching signatures.

Any operation on the shape information related to the certain identifiers within the matching signatures may be applied in order to determine the (higher accuracy) shape information of a region of interest of the input image identified by the certain identifier.

For example—the shapes may be virtually overlaid on each other and the population per pixel may define the shape.

For example—only pixels that appear in at least a majority of the overlaid shaped should be regarded as belonging to the region of interest.

Other operations may include smoothing the overlaid shapes, selecting pixels that appear in all overlaid shapes.

The compressed shape information may be ignored of or be taken into account.

Figure 1I:
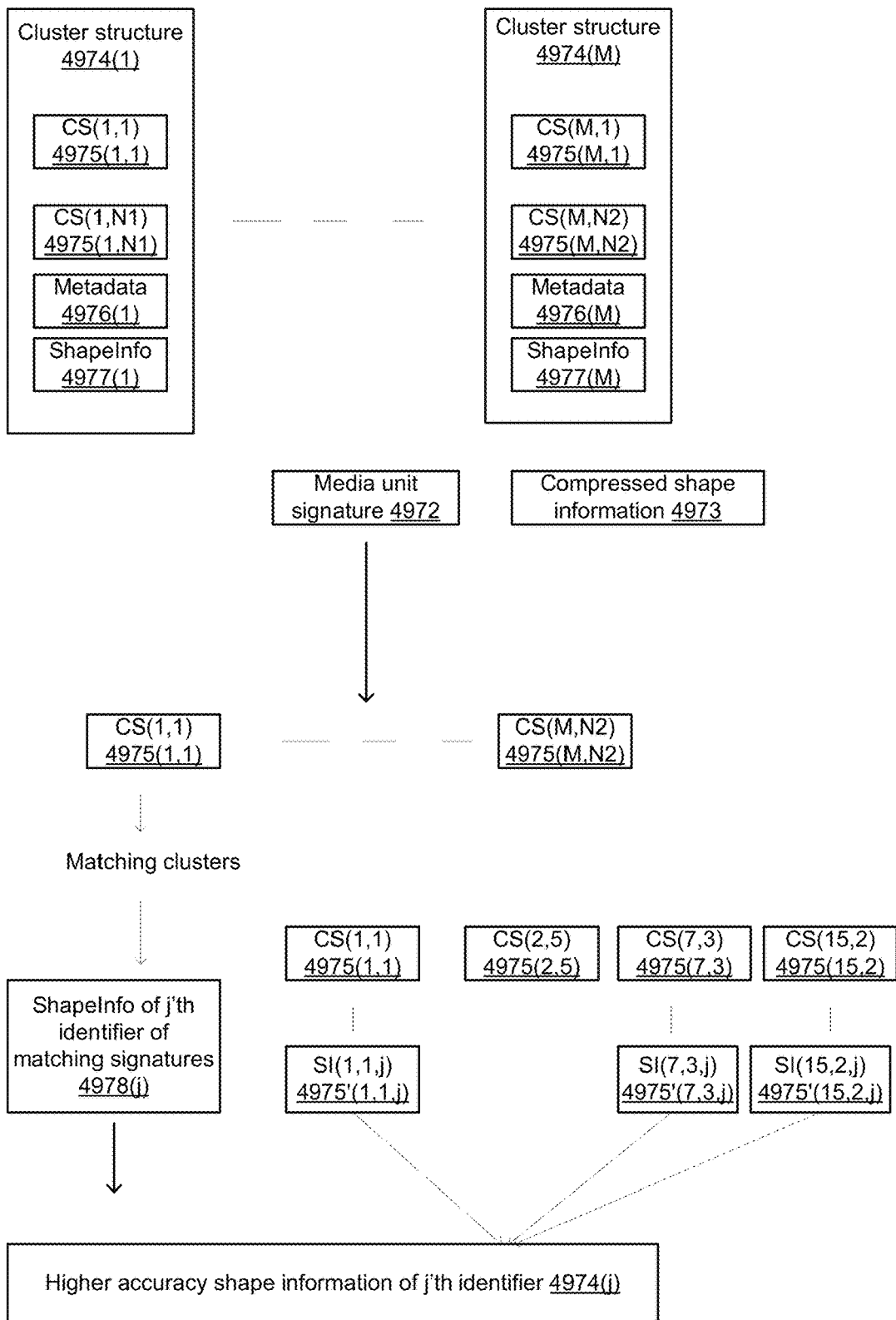
FIG. 1I illustrates an example of a method.

FIG. 1I illustrates a matching process and a generation of a higher accuracy shape information.

It is assumed that there are multiple (M) cluster structures 4974(1)-4974(M). Each cluster structure includes cluster signatures, metadata regarding the cluster signatures, and shape information regarding the regions of interest identified by identifiers of the cluster signatures.

For example—first cluster structure 4974(1) includes multiple (N1) signatures (referred to as cluster signatures CS) CS(1,1)-CS(1,N1) 4975(1,1)-4975(1,N1), metadata 4976(1), and shape information (Shapeinfo 4977(1)) regarding shapes of regions of interest associated with identifiers of the CSs.

Yet for another example—M'th cluster structure 4974(M) includes multiple (N2) signatures (referred to as cluster signatures CS) CS(M,1)-CS(M,N2) 4975(M,1)-4975(M, N2), metadata 4976(M), and shape information (Shapeinfo 4977(M)) regarding shapes of regions of interest associated with identifiers of the CSs.

The number of signatures per concept structure may change over time—for example due to cluster reduction attempts during which a CS is removed from the structure to provide a reduced cluster structure, the reduced structure is checked to determine that the reduced cluster signature may still identify objects that were associated with the (non-reduced) cluster signature—and if so the signature may be reduced from the cluster signature.

The signatures of each cluster structures are associated to each other, wherein the association may be based on similarity of signatures and/or based on association between metadata of the signatures.

Assuming that each cluster structure is associated with a unique object—then objects of a media unit may be identified by finding cluster structures that are associated with said objects. The finding of the matching cluster structures may include comparing a signature of the media unit to signatures of the cluster structures- and searching for one or more matching signature out of the cluster signatures.

In FIG. 1I—a media unit having a hybrid representation undergoes object detection. The hybrid representation includes media unit signature 4972 and compressed shape information 4973.

The media unit signature 4972 is compared to the signatures of the M cluster structures—from CS(1,1) 4975(1,1) till CS(M,N2) 4975(M,N2).

We assume that one or more cluster structures are matching cluster structures.

Once the matching cluster structures are found the method proceeds by generating shape information that is of higher accuracy then the compressed shape information.

The generation of the shape information is done per identifier.

For each j that ranges between 1 and J (J is the number of identifiers per the media unit signature 4972) the method may perform the steps of:

Find (step 4978(j)) the shape information of the j'th identifier of each matching signature- or of each signature of the matching cluster structure.

Generate (step 4979(j)) a higher accuracy shape information of the j'th identifier.

For example—assuming that the matching signatures include CS(1,1) 2975(1,1), CS(2,5) 2975(2,5), CS(7,3) 2975 (7,3) and CS(15,2) 2975(15,2), and that the j'th identifier is included in CS(1,1) 2975(1,1), CS(7,3) 2975(7,3) and CS(15,2) 2975(15,2)—then the shape information of the j'th identifier of the media unit is determined based on the shape information associated with CS(1,1) 2975(1,1), CS(7,3) 2975(7,3) and CS(15,2) 2975(15,2).

Figure 1J:
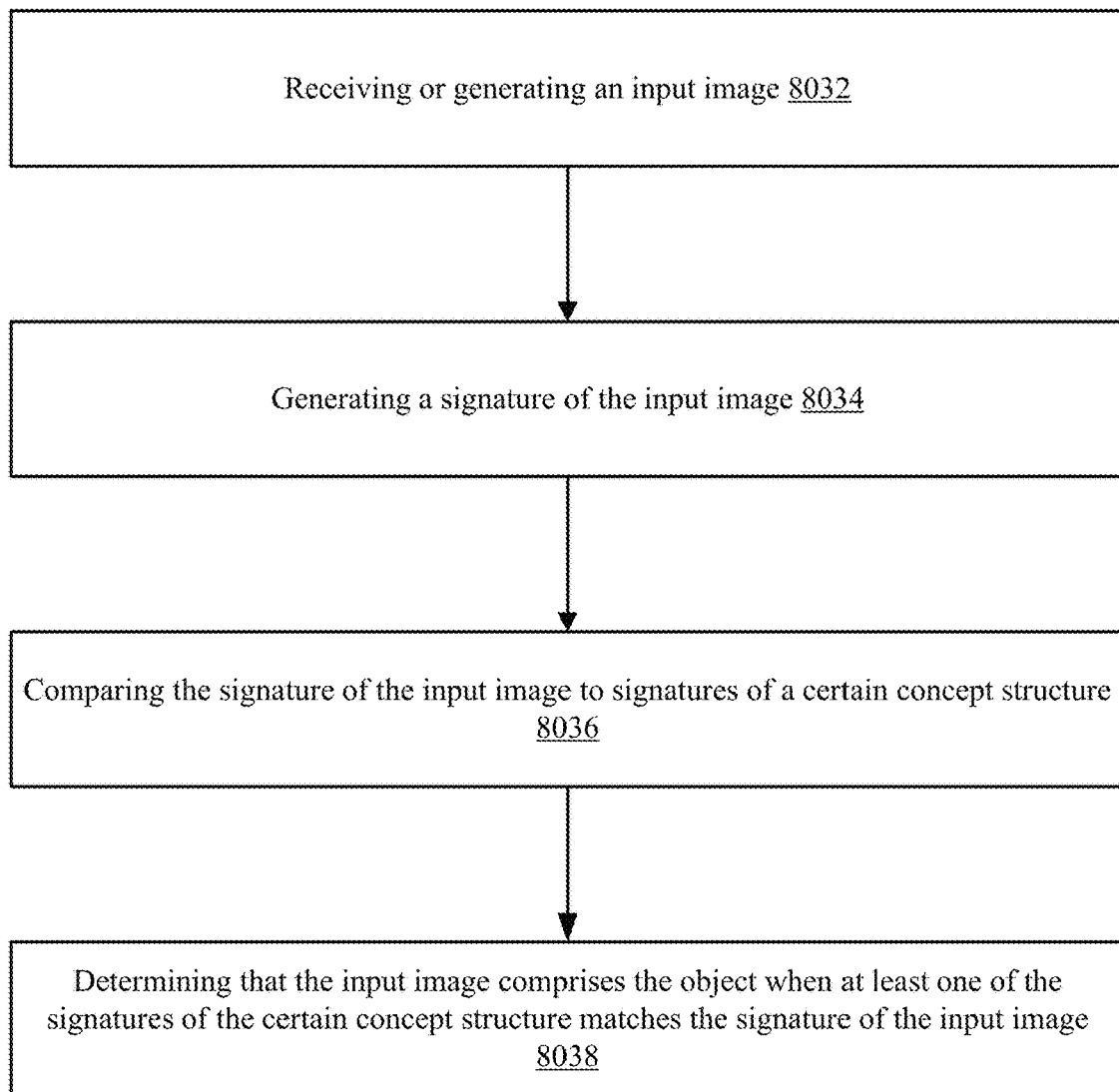
FIG. 1J illustrates an example of a method.
Figure 1K:
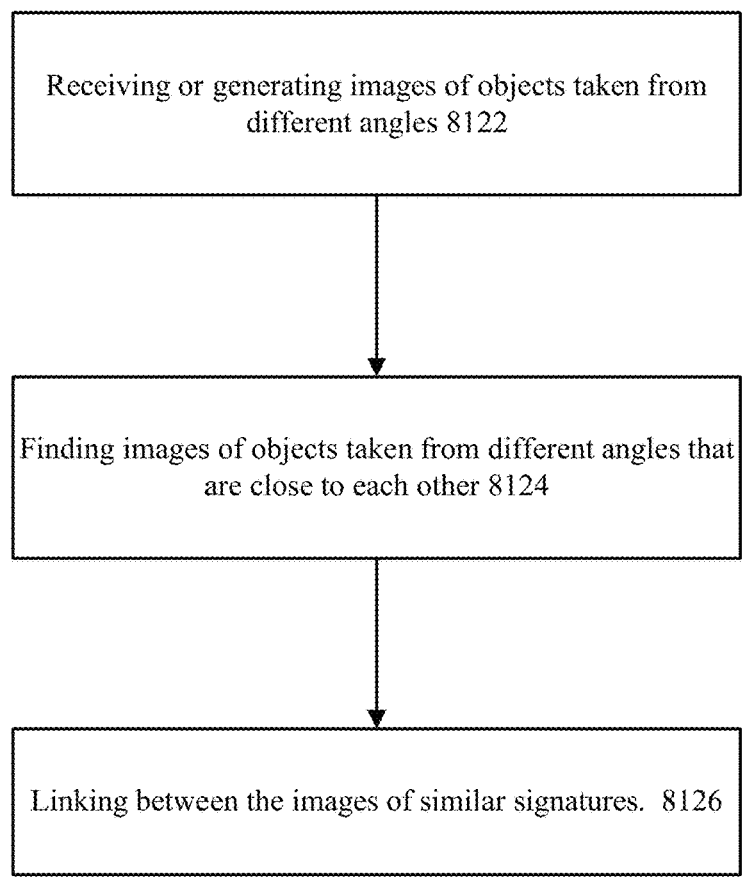
FIG. 1K illustrates an example of a method.
Figure 1L:
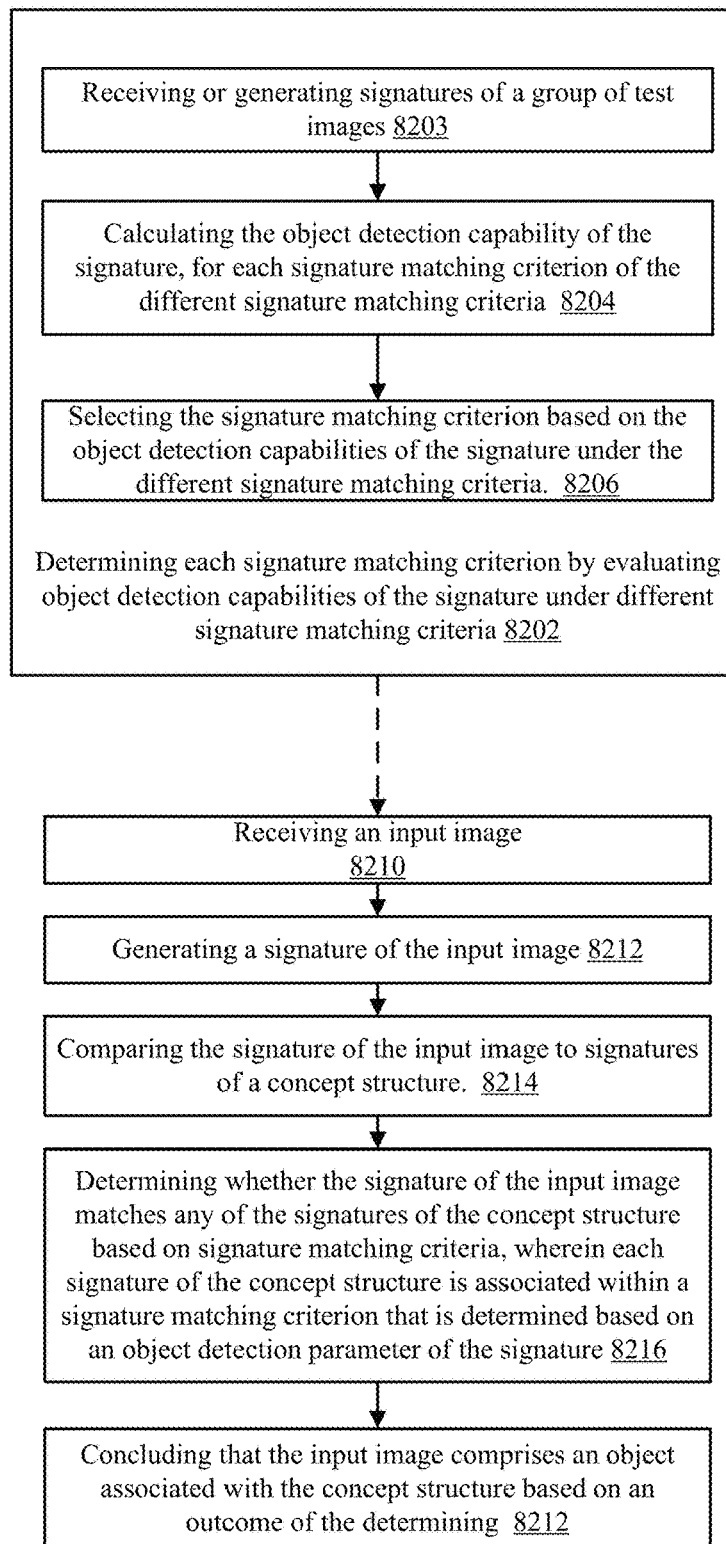
FIG. 1L illustrates an example of a method.
Figure 1M:
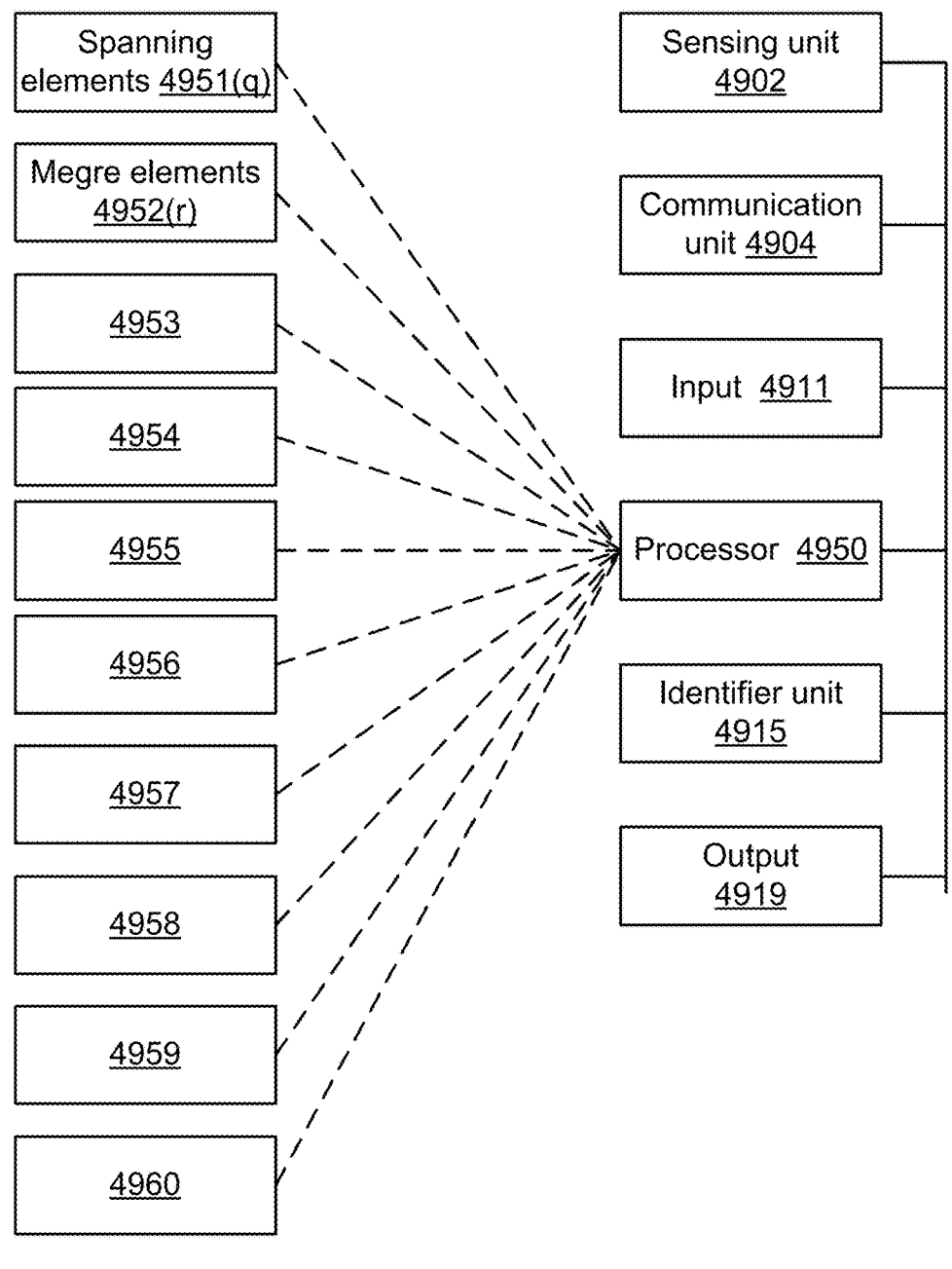
FIG. 1M illustrates an example of a system.
Figure 1N:
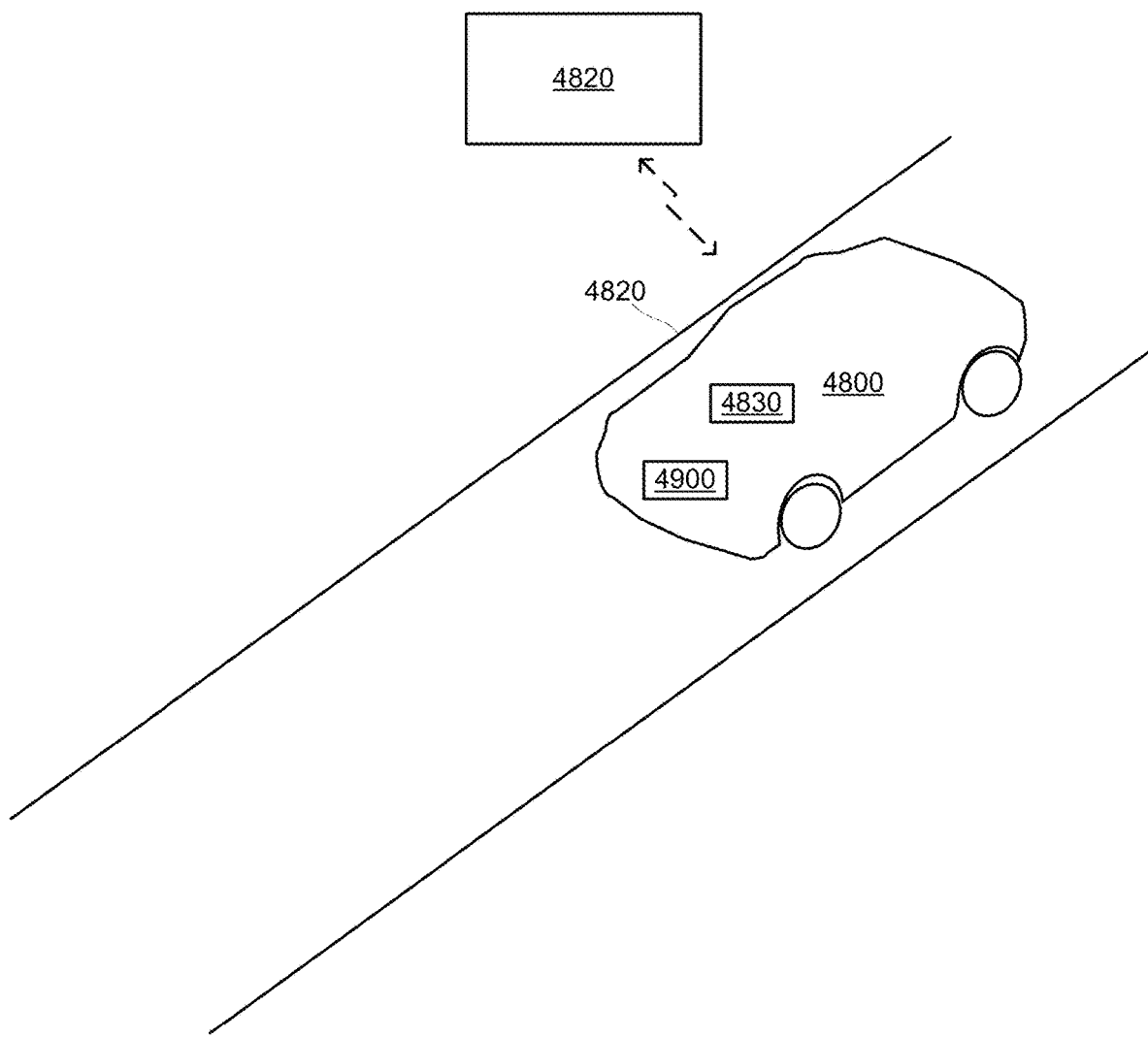
FIG. 1N is a partly-pictorial, partly-block diagram illustration of an exemplary obstacle detection and mapping system, constructed and operative in accordance with embodiments described herein.
Figure 10:
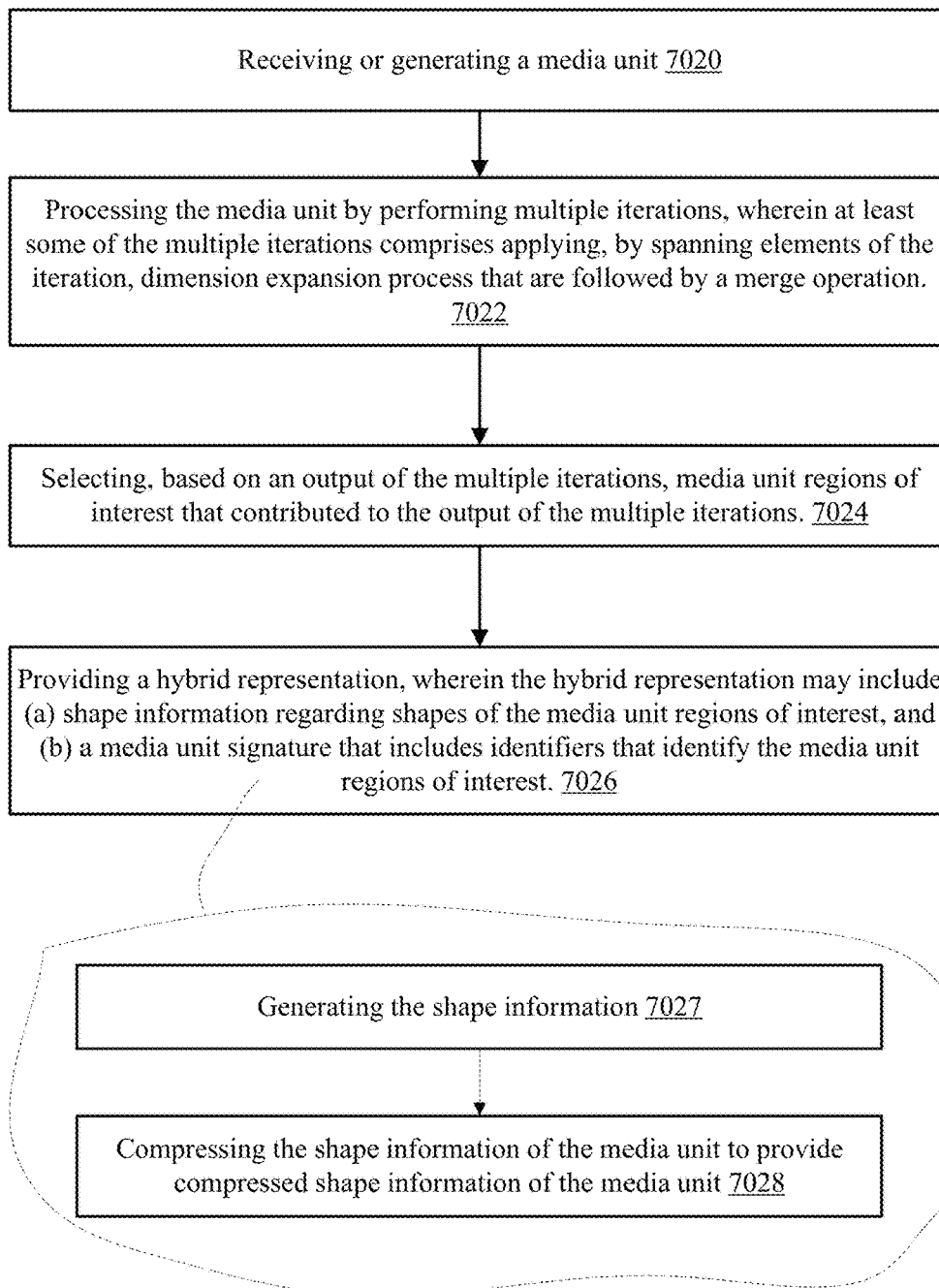
Figure 1P:
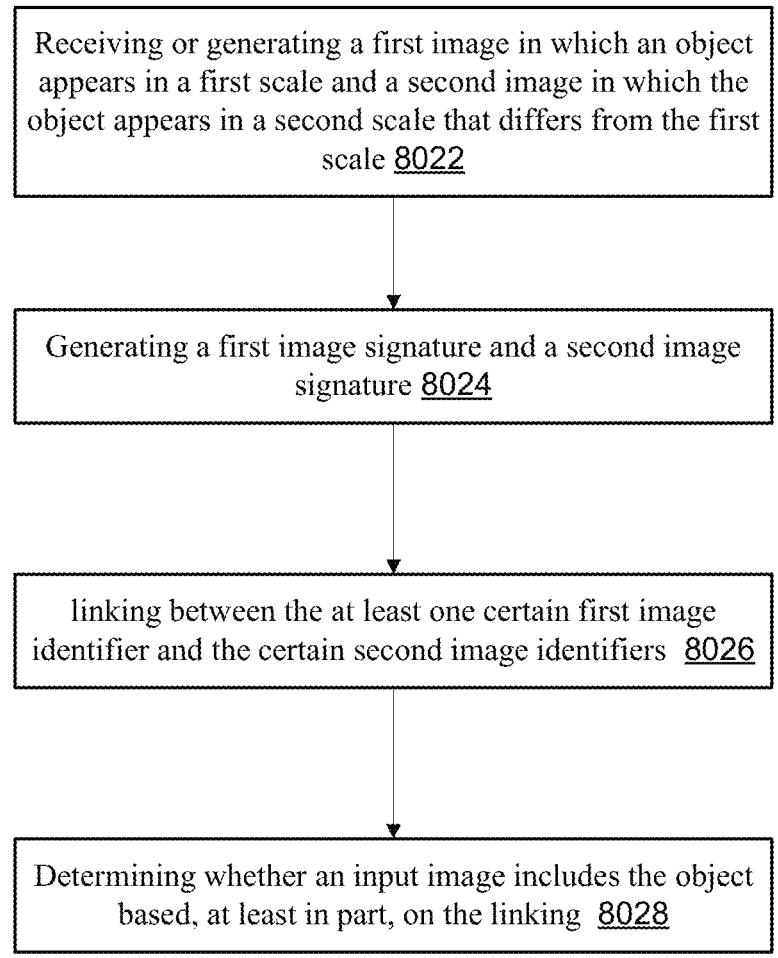
FIG. 1P illustrates an example of a method.

FIG. 1P illustrates an image 8000 that includes four regions of interest 8001, 8002, 8003 and 8004. The signature 8010 of image 8000 includes various identifiers including ID1 8011, ID2 8012, ID3 8013 and ID4 8014 that identify the four regions of interest 8001, 8002, 8003 and 8004.

The shapes of the four regions of interest 8001, 8002, 8003 and 8004 are four polygons. Accurate shape information regarding the shapes of these regions of interest may be generated during the generation of signature 8010.

FIG. 1J illustrates method 8030 for object detection.

Method 8030 may include the steps of method 8020 or may be preceded by steps 8022, 8024 and 8026.

Method 8030 may include a sequence of steps 8032, 8034, 8036 and 8038.

Step 8032 may include receiving or generating an input image.

Step 8034 may include generating a signature of the input image.

Step 8036 may include comparing the signature of the input image to signatures of a certain concept structure. The certain concept structure may be generated by method 8020.

Step 8038 may include determining that the input image comprises the object when at least one of the signatures of the certain concept structure matches the signature of the input image.

FIG. 2D illustrates method 8040 for object detection.

Method 8040 may include the steps of method 8020 or may be preceded by steps 8022, 8024 and 8026.

Method 8040 may include a sequence of steps 8041, 8043, 8045, 8047 and 8049.

Step 8041 may include receiving or generating an input image.

Step 8043 may include generating a signature of the input image, the signature of the input image comprises only some of the certain second image identifiers; wherein the input image of the second scale.

Step 8045 may include changing a scale of the input image to the first scale to a provide an amended input image.

Step 8047 may include generating a signature of the amended input image.

Step 8049 may include verifying that the input image comprises the object when the signature of the amended input image comprises the at least one certain first image identifier.

Object Detection that is Robust to Angle of Acquisition.

Object detection may benefit from being robust to the angle of acquisition—to the angle between the optical axis of an image sensor and a certain part of the object. This allows the detection process to be more reliable, use fewer different clusters (may not require multiple clusters for identifying the same object from different images).

FIG. 1K illustrates method 8120 that includes the following steps:

Step 8122 of receiving or generating images of objects taken from different angles.

Step 8124 of finding images of objects taken from different angles that are close to each other. Close enough may be less than 1, 5, 10, 15 and 20 degrees—but the closeness may be better reflected by the reception of substantially the same signature.

Step 8126 of linking between the images of similar signatures. This may include searching for local similarities.

The similarities are local in the sense that they are calculated per a subset of signatures. For example—assuming that the similarity is determined per two images—then a first signature may be linked to a second signature that is similar to the first image. A third signature may be linked to the second image based on the similarity between the second and third signatures—and even regardless of the relationship between the first and third signatures.

Step 8126 may include generating a concept data structure that includes the similar signatures.

This so-called local or sliding window approach, in addition to the acquisition of enough images (that will statistically provide a large angular coverage) will enable to generate a concept structure that include signatures of an object taken at multiple directions.

Signature Tailored Matching Threshold.

Object detection may be implemented by (a) receiving or generating concept structures that include signatures of media units and related metadata, (b) receiving a new media unit, generating a new media unit signature, and (c) comparing the new media unit signature to the concept signatures of the concept structures.

The comparison may include comparing new media unit signature identifiers (identifiers of objects that appear in the new media unit) to concept signature identifiers and determining, based on a signature matching criteria whether the new media unit signature matches a concept signature. If such a match is found then the new media unit is regarded as including the object associated with that concept structure.

It was found that by applying an adjustable signature matching criteria, the matching process may be highly effective and may adapt itself to the statistics of appearance of identifiers in different scenarios. For example—a match may be obtained when a relatively rear but highly distinguishing identifier appears in the new media unit signature and in a cluster signature, but a mismatch may be declared when multiple common and slightly distinguishing identifiers appear in the new media unit signature and in a cluster signature.

FIG. 1L illustrates method 8200 for object detection.

Method 8200 may include:

Step 8210 of receiving an input image.

Step 8212 of generating a signature of the input image.

Step 8214 of comparing the signature of the input image to signatures of a concept structure.

Step 8216 of determining whether the signature of the input image matches any of the signatures of the concept structure based on signature matching criteria, wherein each signature of the concept structure is associated within a signature matching criterion that is determined based on an object detection parameter of the signature.

Step 8218 of concluding that the input image comprises an object associated with the concept structure based on an outcome of the determining.

The signature matching criteria may be a minimal number of matching identifiers that indicate of a match. For example—assuming a signature that include few tens of identifiers, the minimal number may vary between a single identifier to all of the identifiers of the signature.

It should be noted that an input image may include multiple objects and that a signature of the input image may match multiple cluster structures. Method 8200 is applicable to all of the matching processes- and that the signature matching criteria may be set for each signature of each cluster structure.

Step 8210 may be preceded by step 8202 of determining each signature matching criterion by evaluating object detection capabilities of the signature under different signature matching criteria.

Step 8202 may include:

Step 8203 of receiving or generating signatures of a group of test images.

Step 8204 of calculating the object detection capability of the signature, for each signature matching criterion of the different signature matching criteria.

Step 8206 of selecting the signature matching criterion based on the object detection capabilities of the signature under the different signature matching criteria.

The object detection capability may reflect a percent of signatures of the group of test images that match the signature.

The selecting of the signature matching criterion comprises selecting the signature matching criterion that once applied results in a percent of signatures of the group of test images that match the signature that is closets to a predefined desired percent of signatures of the group of test images that match the signature.

The object detection capability may reflect a significant change in the percent of signatures of the group of test images that match the signature. For example—assuming, that the signature matching criteria is a minimal number of matching identifiers and that changing the value of the minimal numbers may change the percentage of matching test images. A substantial change in the percentage (for example a change of more than 10, 20, 30, 40 percent) may be indicative of the desired value. The desired value may be set before the substantial change, proximate to the substantial change, and the like.

For example, referring to FIG. 1I, cluster signatures CS(1,1), CS(2,5), CS(7,3) and CS(15,2) match unit signature 4972. Each of these matches may apply a unique signature matching criterion.

Examples of Systems

FIG. 1M illustrates an example of a system capable of executing one or more of the mentioned above methods.

The system include various components, elements and/or units.

A component element and/or unit may be a processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Alternatively, each component element and/or unit may implemented in hardware, firmware, or software that may be executed by a processing circuitry.

System 4900 may include sensing unit 4902, communication unit 4904, input 4911, one or more processors—such as processor 4950, and output 4919. The communication unit 4904 may include the input and/or the output. The communication unit 4904 may communicate with any entity—within the vehicle (for example driver device, passenger device, multimedia device), outside the vehicle (another vehicle, another computerized system—such as out-of-vehicle computerized system 4820 of FIG. 1N, another road user, another human outside the vehicle), and the like.

Input and/or output may be any suitable communications component such as a network interface card, universal serial bus (USB) port, disk reader, modem or transceiver that may be operative to use protocols such as are known in the art to communicate either directly, or indirectly, with other elements of the system.

Processor 4950 may include at least some out of (and thus may not include at least one out of):

Multiple spanning elements 4951(*q*).
Multiple merge elements 4952(*r*).
Object detector 4953.
Cluster manager 4954.
Controller 4955.
Selection unit 4956.
Object detection determination unit 4957.
Signature generator 4958.
Movement information unit 4959.
Identifier unit 4960.

While system 4900 includes a sensing unit 4902—is should be noted that it may receive sensed information from other sensors and/or that the sensing unit does not belong to the system. The system may receive information from one or more sensors located in the vehicle, associated with the vehicle, and/or located outside the vehicle.

Any method illustrated in the specification may be fully or partially executed by system 4900, and/or may be fully or partially executed by one or more other computerized system, and/or by one or more computerized systems—for example by task allocations between computerized systems, by a cooperation (for example—exchange of information, exchange of decisions, any allocation of resources, collaborative decision, and the like) between multiple computerized systems.

The one or more other computerized systems may be, for example, out-of-vehicle computerized system 4820 of FIG. 1N, any other out-of-vehicle computerized system, one or more other in-vehicle systems, a computerized device of a person within the vehicle, any computerized system outside the vehicle—including for example a computerized system of another vehicle.

An example of an other in-vehicle system is denoted 4830 in FIG. 1N and is located within vehicle 4800 that drives along road 4820.

System 4900 may obtain sensed information from any type of sensors—a camera, one or more sensors implemented using any suitable imaging technology instead of, or in addition to, a conventional camera, an infrared sensor, a radar, an ultrasound sensor, any electro-optic sensor, a radiography sensor, a LIDAR (light detection and ranging), telemetry ECU sensor, shock sensor, etc.

System 4900 and/or other in-vehicle system is denoted 4830 may use supervised and/or unsupervised learning to perform any method executed by them.

The other in-vehicle system 4830 may be an autonomous driving system, an advance driver assistance system, or may differ from an autonomous driving system and from an advance driver assistance system.

The other in-vehicle system 4830 may include processing circuitry 210, input/output (I/O) module 220, one or more sensors 233, and database 270. The processing circuitry 210 may execute any task is it assigned or programmed to perform in relation to any of the methods illustrate din the application. Alternatively—the other in-vehicle system 4830 may include another module for executing (alone or with the processing circuit) any such task. For example—the processing circuitry may execute instructions to provide an autonomous driving manager functionality. Alternatively—another circuit or module of the in-vehicle system 4830 may provide the autonomous driving manager functionality.

FIG. 1O illustrates method 7002 of generating a hybrid representation of a media unit.

Method 7002 may include a sequence of steps 7020, 7022, 7024 and 7026.

Step 7020 may include receiving or generating the media unit.

Step 7022 may include processing the media unit by performing multiple iterations, wherein at least some of the multiple iterations comprises applying, by spanning elements of the iteration, dimension expansion process that are followed by a merge operation.

Step 7024 may include selecting, based on an output of the multiple iterations, media unit regions of interest that contributed to the output of the multiple iterations.

Step 7026 may include providing a hybrid representation, wherein the hybrid representation may include (a) shape information regarding shapes of the media unit regions of interest, and (b) a media unit signature that includes identifiers that identify the media unit regions of interest.

Step 7024 may include selecting the media regions of interest per segment out of multiple segments of the media unit. See, for example, FIG. 2.

Step 7026 may include step 7027 of generating the shape information.

The shape information may include polygons that represent shapes that substantially bound the media unit regions of interest. These polygons may be of a high degree.

In order to save storage space, the method may include step 7028 of compressing the shape information of the media unit to provide compressed shape information of the media unit.

FIG. 1P illustrates method 8020 for scale invariant object detection.

Method 8020 may include a first sequence of steps that may include step 8022, 8024, 8026 and 8028.

Step 8022 may include receiving or generating a first image in which an object appears in a first scale and a second image in which the object appears in a second scale that differs from the first scale.

Step 8024 may include generating a first image signature and a second image signature.

The first image signature includes a first group of at least one certain first image identifier that identifies at least a part of the object.

The second image signature includes a second group of certain second image identifiers that identify different parts of the object.

The second group is larger than first group—as the second group has more members than the first group.

Step 8026 may include linking between the at least one certain first image identifier and the certain second image identifiers.

Step 8026 may include linking between the first image signature, the second image signature and the object.

Step 8026 may include adding the first signature and the second signature to a certain concept structure that is associated with the object.

Step 8028 may include determining whether an input image includes the object based, at least in part, on the linking. The input image differs from the first and second images.

The determining may include determining that the input image includes the object when a signature of the input image includes the at least one certain first image identifier or the certain second image identifiers.

The determining may include determining that the input image includes the object when the signature of the input image includes only a part of the at least one certain first image identifier or only a part of the certain second image identifiers.

The linking may be performed for more than two images in which the object appears in more than two scales.

Figure 1Q:
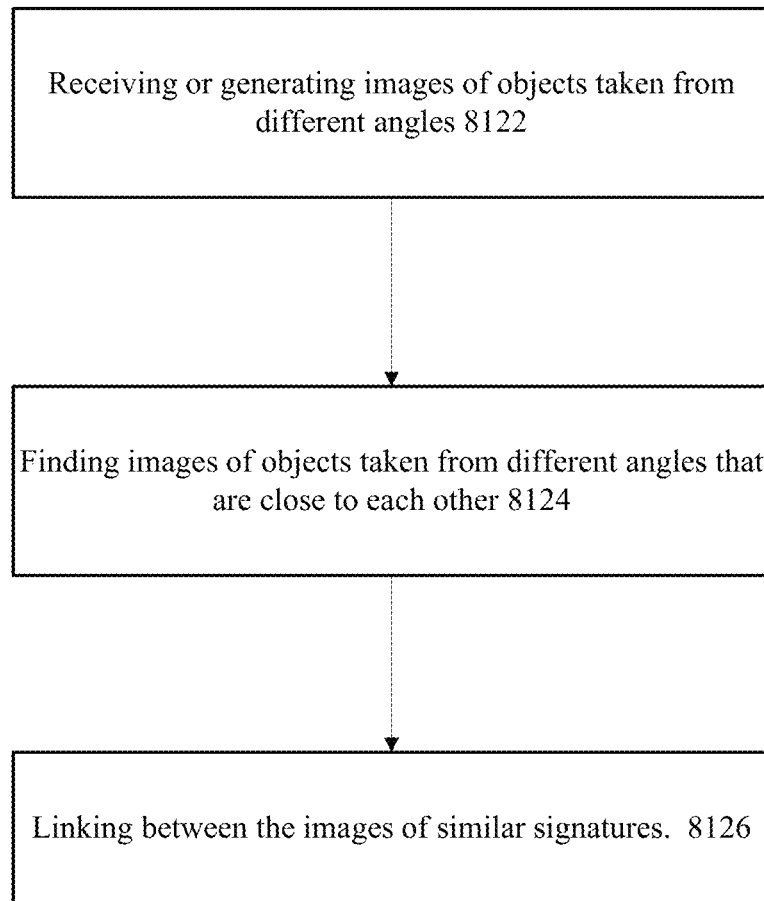
FIG. 1Q illustrates an example of a method.

FIG. 1Q illustrates method 8200 for object detection.

Method 8200 may include:

Step 8210 of receiving an input image.

Step 8212 of generating a signature of the input image.

Step 8214 of comparing the signature of the input image to signatures of a concept structure.

Step 8216 of determining whether the signature of the input image matches any of the signatures of the concept structure based on signature matching criteria, wherein each signature of the concept structure is associated within a signature matching criterion that is determined based on an object detection parameter of the signature.

Step 8218 of concluding that the input image comprises an object associated with the concept structure based on an outcome of the determining.

The signature matching criteria may be a minimal number of matching identifiers that indicate of a match. For example—assuming a signature that include few tens of identifiers, the minimal number may vary between a single identifier to all of the identifiers of the signature.

It should be noted that an input image may include multiple objects and that a signature of the input image may match multiple cluster structures. Method 8200 is applicable to all of the matching processes- and that the signature matching criteria may be set for each signature of each cluster structure.

Step 8210 may be preceded by step 8202 of determining each signature matching criterion by evaluating object detection capabilities of the signature under different signature matching criteria.

Step 8202 may include:

Step 8203 of receiving or generating signatures of a group of test images.

Step 8204 of calculating the object detection capability of the signature, for each signature matching criterion of the different signature matching criteria.

Step 8206 of selecting the signature matching criterion based on the object detection capabilities of the signature under the different signature matching criteria.

The object detection capability may reflect a percent of signatures of the group of test images that match the signature.

The selecting of the signature matching criterion comprises selecting the signature matching criterion that once applied results in a percent of signatures of the group of test images that match the signature that is closets to a predefined desired percent of signatures of the group of test images that match the signature.

The object detection capability may reflect a significant change in the percent of signatures of the group of test images that match the signature. For example—assuming, that the signature matching criteria is a minimal number of matching identifiers and that changing the value of the minimal numbers may change the percentage of matching test images. A substantial change in the percentage (for example a change of more than 10, 20, 30, 40 percent) may be indicative of the desired value. The desired value may be set before the substantial change, proximate to the substantial change, and the like.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer program may be provided on non-transitory computer readable media permanently, removably or remotely coupled to an information processing system. The non-transitory computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for unregulated pedestrian step down alert, the method comprises:

receiving, by a vehicle computerized system that comprises one or more integrated circuits, unregulated pedestrian step down (PSD) indicators that are indicative of unregulated PSD situations;

obtaining sensed information regarding an environment of a vehicle;

processing, by the vehicle computerized system, the sensed information, wherein the processing comprises searching for at least one of the unregulated PSD indicators; and autonomously determining by the vehicle computerized system, when finding the at least one of the unregulated PSD identifiers, that the vehicle is approaching a situation in which a pedestrian is expected to step down into a drivable space within the environment of the vehicle; and responding to the determining by autonomously driving the vehicle by an autonomous driving system of the vehicle;

wherein the unregulated PSD indicators are generated, using a neural network, by:

obtaining a first group of untagged video recordings;

identifying, within the first group of untagged video recordings, unregulated PSD events;

generating the unregulated PSD indicators by a generation process that comprises processing PSD event video segments, wherein each PSD event video segment starts at a period of time preceding a starting of a corresponding unregulated PSD event of the unregulated PSD events; and removing identifiers of objects that appear in the unregulated PSD event video segments and are not a characteristic of the unregulated PSD events.

2. The method according to claim 1, wherein the removing comprising searching for objects that appear, above a predefined probability, in video segments that differ from the unregulated PSD event video segments.

3. The method according to claim 1, wherein the generating of the unregulated PSD indicators comprises:
generating unregulated PSD event video segments signatures;
clustering the unregulated PSD event video segments signatures to provide multiple clusters; and
generating cluster signatures for the multiple clusters.

4. The method according to claim 3 wherein at least some of the unregulated PSD indicators are cluster signatures.

5. The method according to claim 1, wherein the generation process comprises classifying the pedestrians to multiple pedestrian classes.

6. The method according to claim 5 comprising associating the pedestrian classes with unregulated PSD indicators that are relevant to the pedestrian classes.

7. The method according to claim 1, further comprising associating probability of occurrence information to the unregulated PSD indicators.

8. The method according to claim 1, wherein the responding comprises transferring control over the vehicle from a human driver of the vehicle to the autonomous driving system.

9. A non-transitory computer readable medium for unregulated pedestrian step down alert, the non-transitory computer readable medium stores instructions for:
receiving, by a vehicle computerized system that comprises one or more integrated circuits, unregulated pedestrian step down (PSD) indicators indicative of unregulated PSD situations;
obtaining sensed information regarding an environment of a vehicle;
processing the sensed information, wherein the processing comprises searching for at least one of the unregulated PSD indicators;
autonomously determining, by the vehicle computerized system, when finding the at least one of the unregulated PSD identifiers, that the vehicle is approaching a situation in which a pedestrian is expected to step down into a drivable space within the environment of the vehicle;
responding to the determining by autonomously driving the vehicle by an autonomous driving system of the vehicle;
wherein the unregulated PSD indicators are generated by:
obtaining a first group of untagged video recordings;
finding, within the first group of untagged video recordings, unregulated PSD events;
generating the unregulated PSD indicators by a generation process that comprises processing PSD event video segments, wherein each PSD event video segment starts at a period of time that precedes a starting of a corresponding unregulated PSD event of the unregulated PSD events; and
removing identifiers of objects that appear in the unregulated PSD event video segments and that are not a characteristic of the unregulated PSD events.

10. The non-transitory computer readable medium according to claim 9, wherein the removing comprising searching for objects that appear, above a predefined probability, in video segments that differ from the unregulated PSD event video segments.

11. The non-transitory computer readable medium according to claim 9, wherein the generating of the unregulated PSD indicators comprises:
generating unregulated PSD event video segments signatures;
clustering the unregulated PSD event video segments signatures to provide multiple clusters; and
generating cluster signatures for the multiple clusters.

12. The non-transitory computer readable medium according to claim 11 wherein at least some of the unregulated PSD indicators are cluster signatures.

13. The non-transitory computer readable medium according to claim 9, wherein the generation process comprises classifying the pedestrians to multiple pedestrian classes.

14. The non-transitory computer readable medium according to claim 13 that stores instructions for associating the pedestrian classes with unregulated PSD indicators that are relevant to the pedestrian classes.

15. The non-transitory computer readable medium according to claim 9 that stores instructions for associating probability of occurrence information to the unregulated PSD indicators.

16. The non-transitory computer readable medium according to claim 9, further storing instructions for transferring control over the vehicle from a human driver of the vehicle to the autonomous driving system.

* * * * *